(12) United States Patent
Akhazhanov et al.

(10) Patent No.: US 11,727,278 B2
(45) Date of Patent: *Aug. 15, 2023

(54) METHOD, SYSTEM, AND COMPUTER PROGRAM PRODUCT FOR GENERATING NEW ITEMS COMPATIBLE WITH GIVEN ITEMS

(71) Applicant: Visa International Service Association, San Francisco, CA (US)

(72) Inventors: Ablaikhan Akhazhanov, Los Angeles, CA (US); Maryam Moosaei, San Jose, CA (US); Hao Yang, San Jose, CA (US)

(73) Assignee: Visa International Service Association, San Francisco, CA (US)

( * ) Notice: Subject to any disclaimer, the term of this patent is extended or adjusted under 35 U.S.C. 154(b) by 182 days.

This patent is subject to a terminal disclaimer.

(21) Appl. No.: 17/348,087

(22) Filed: Jun. 15, 2021

(65) Prior Publication Data

US 2021/0312247 A1 Oct. 7, 2021

Related U.S. Application Data

(63) Continuation of application No. 16/439,861, filed on Jun. 13, 2019, now Pat. No. 11,068,753.

(51) Int. Cl.
*G06V 10/764* (2022.01)
*G06N 3/084* (2023.01)
(Continued)

(52) U.S. Cl.
CPC ......... *G06N 3/084* (2013.01); *G06F 18/2411* (2023.01); *G06N 3/045* (2023.01);
(Continued)

(58) Field of Classification Search
CPC .... G06F 18/2411; G06N 20/10; G06N 20/20; G06N 3/045; G06N 3/047; G06N 3/08;
(Continued)

(56) References Cited

U.S. PATENT DOCUMENTS 9,999,550 B2 * 6/2018 Piantoni ............ A61F 13/15674
10,521,705 B2 * 12/2019 Lu ....................... G06F 18/2415
(Continued)

OTHER PUBLICATIONS

Denton et al., "Deep Generative Image Models using a Laplacian Pyramid of Adversarial Networks", Advances in Neural Information Processing Systems, 2015, pp. 1-10.
(Continued)

*Primary Examiner* — Tsung Yin Tsai
(74) *Attorney, Agent, or Firm* — The Webb Law Firm

(57) ABSTRACT

A computer-implemented method, a computing system, and a computer program product for generating new items compatible with given items may use data associated with a plurality of images and random noise data associated with a random noise image to train an adversarial network including a series of generator networks and a series of discriminator networks corresponding to the series of generator networks by modifying, using a loss function of the adversarial network that depends on a compatibility of the images, one or more parameters of the series of generator networks. The series of generator networks may generate a generated image associated with a generated item different than the given items.

18 Claims, 5 Drawing Sheets

(51) Int. Cl.
*G06N 3/08* (2023.01)
*G06N 20/20* (2019.01)
*G06N 20/10* (2019.01)
*G06F 18/2411* (2023.01)
*G06N 3/045* (2023.01)
*G06V 10/82* (2022.01)

(52) U.S. Cl.
CPC .............. *G06N 3/08* (2013.01); *G06N 20/10* (2019.01); *G06N 20/20* (2019.01); *G06V 10/764* (2022.01); *G06V 10/82* (2022.01)

(58) Field of Classification Search
CPC .... G06N 3/084; G06T 11/001; G06V 10/764; G06V 10/82
See application file for complete search history.

(56) References Cited

U.S. PATENT DOCUMENTS

| | | | | |
|---|---|---|---|---|
| 10,592,779 B2* | 3/2020 | Madani | ................ | G06T 7/0012 |
| 10,943,352 B2* | 3/2021 | Sun | ........................ | G06V 10/82 |
| 10,970,765 B2* | 4/2021 | Fang | ..................... | G06F 16/535 |
| 2019/0147305 A1* | 5/2019 | Lu | ....................... | G06F 18/2413 |
| | | | | 382/157 |
| 2019/0147320 A1* | 5/2019 | Mattyus | ............... | G06V 20/182 |
| | | | | 382/155 |
| 2019/0251612 A1* | 8/2019 | Fang | ................. | G06Q 30/0631 |
| 2020/0134089 A1 | 4/2020 | Sankaran et al. | | |
| 2020/0193607 A1* | 6/2020 | Sun | ...................... | G06V 10/255 |

OTHER PUBLICATIONS

Goodfellow et al., "Generative Adversarial Nets", Advances in Neural Information Processing Systems, 2014, pp. 1-9.
Karras et al., "Progressive Growing of GANs for Improved Quality, Stability, and Variation", arXiv preprint arXiv:1710.10196, 2017, pp. 1-26.
Zhang et al., "StackGAN++: Realistic Image Synthesis with Stacked Generative Adversarial Networks", arXiv preprint arXiv:1710. 10916, 2017, pp. 1-16.
Zhang et al., "StackGAN: Text to Photo-realistic Image Synthesis with Stacked Generative Adversarial Networks", Proceedings of the IEEE International Conference on Computer Vision, 2017, pp. 1-14.

* cited by examiner

METHOD, SYSTEM, AND COMPUTER PROGRAM PRODUCT FOR GENERATING NEW ITEMS COMPATIBLE WITH GIVEN ITEMS

CROSS REFERENCE TO RELATED APPLICATIONS

This application is a continuation of U.S. patent application Ser. No. 16/439,861 filed on Jun. 13, 2019, the disclosure of which is hereby incorporated by reference in its entirety.

BACKGROUND

1. Field

This disclosure relates generally to methods, systems, and products for generating items, and in some embodiments or aspects, to a method, a system, and a product for generating new items compatible with given items.

2. Technical Considerations

Over the past decade, the fashion industry has grown into one of the largest international markets. Among the main factors driving this growth are global economic development, rapid penetration of the Internet and smartphones, and advances in e-commerce technologies. The use of personalization and deep customer engagement has increased due to increased competition in the market, which has led to a proliferation of recommendation systems including visually-aware deep relation networks.

In the future, consumers may want to be a part of a design process for the items (e.g., clothing items, etc.) that the consumers purchase. However, designing novel fashion items may be a challenging problem, because the process may require high quality images and diversity of the images. Creating compatible items may be an even more challenging problem, because the process may require a fundamental understanding of item compatibility. Accordingly, there is a need for improved generation of items.

SUMMARY

Accordingly, provided are improved systems, devices, products, apparatus, and/or methods for generating new items compatible with given items.

According to some non-limiting embodiments or aspects, provided is a computer-implemented method including: obtaining, with at least one processor, training data associated with a plurality of images and random noise data associated with a random noise image, each image of the plurality of images being associated with a single item of a plurality of items; training, with at least one processor, an adversarial network including a series of generator networks including a first generator network and at least one further generator network and a series of discriminator networks corresponding to the series of generator networks and including a first discriminator network and at least one further discriminator network by: processing, with a first generator network of the series of generator networks, a representation of a set of images of the plurality of images and the random noise image, to generate generated image data associated with a generated image, the generated image being associated with a generated item different than each item of the plurality of items; processing, with a first discriminator network of the series of discriminator networks, the generated image data, to determine a prediction of whether the generated item is real; processing, with each respective further generator network of the at least one further generator network, a further representation of the set of images of the plurality of images and the generated image data from a preceding generator network of the series of generator networks, to generate further generated image data associated with at least one further generated image, the at least one further generated image being associated with the generated item different than each item of the plurality of items; and processing, with each respective further discriminator network of the at least one further discriminator network, the further generated image data from a corresponding generator network of the series of generator networks, to determine at least one further prediction of whether the generated item is real; and modifying, using a loss function of the adversarial network that depends on (i) a compatibility score including a prediction of a compatibility of the set of images and the generated image, (ii) at least one further compatibility score including a prediction of a compatibility of the set of images and the at least one further generated image, (iii) the prediction, and (iv) the at least one further prediction, one or more parameters of the series of generator networks.

In some non-limiting embodiments or aspects, training the adversarial network includes: processing, with the first generator network of the series of generator networks, (a) the representation of the set of images of the plurality of images and the random noise image and (b) a representation of an item category, to generate the generated image data associated with the generated image; processing, with the first discriminator network of the series of discriminator networks, the generated image data and the representation of the item category, to determine the prediction, the prediction including predictions of (i) whether the generated item is real and (ii) whether the generated item is associated with the item category; processing, with each respective further generator network of the at least one further generator network, (a) the at least one further representation of the set of images of the plurality of images and the generated image data from the preceding generator network of the series of generator networks and (b) the representation of the item category, to generate the further generated image data associated with the at least one further generated image; and processing, with each respective further discriminator network of the at least one further discriminator network, the generated image data from the corresponding generator network of the series of generator networks and the representation of the item category, to determine the at least one further prediction, the at least one further prediction including predictions of (i) whether the generated item is real and (ii) whether the generated item is associated with the item category.

In some non-limiting embodiments or aspects, the set of images includes a subset of images of the plurality of images, and the generated item is associated with a same item category as an item of the plurality of items not included in a set of items associated with the set of images.

In some non-limiting embodiments or aspects, the set of images includes each image of the plurality of images, and the generated item is associated with a different item category than each item of the plurality of items.

In some non-limiting embodiments or aspects, training the adversarial network includes: processing, with a first relation network of a series of relation networks corresponding to the series of generator networks and including the first relation network and at least one further relation network, the set of images of the plurality of images and the generated image data from the first generator network of the series of generator networks, to determine the compatibility score including the prediction of the compatibility of the set of images and the generated image; processing, with each respective further relation network of the at least one further relation network, the set of images of the plurality of images and the further generated image data from a corresponding generator network of the series of generator networks, to determine the at least one further compatibility score including the prediction of the compatibility of the set of images and the at least one further generated image.

In some non-limiting embodiments or aspects, training the adversarial network includes: processing, with the first relation network of the series of relation networks, the set of images and the generated image, to determine a feature vector representation of the set of images and the generated image; processing, with each respective further relation network of the at least one further relation network, the set of images and the at least one further generated image, to determine at least one further feature vector representation of the set of images and the at least one further generated image; processing, with another relation network, the plurality of images, to determine another feature vector representation of the plurality of images; determining a first divergence between the feature vector representation and the another feature vector representation; determining at least one further divergence between each further feature vector representation of the at least one further feature vector representation and the another feature vector representation, the loss function of the adversarial network further depending on the divergence and the at least one further divergence.

In some non-limiting embodiments or aspects, training the adversarial network includes: processing, with an initial relation network, the set of images and the random noise image, to determine the representation of (a) the set of images of the plurality of images and (b) the random noise image as an initial feature vector representation of the set of images and the random noise image.

In some non-limiting embodiments or aspects, the method further includes providing, with at least one processor, the series of generator networks including the one or more parameters that have been modified based on the loss function of the adversarial network; obtaining, with at least one processor, input data associated with a further plurality of images and further random noise data associated with a further random noise image; and processing, with at least one processor using the series of generator networks, the input data and the further random noise data to generate output data.

According to some non-limiting embodiments or aspects, provided is a computer-implemented method including: obtaining, with at least one processor, input data associated with a plurality of images and random noise data associated with a random noise image, each image of the plurality of images being associated with a single item of a plurality of items; processing, with an initial relation network, a set of images of the plurality of images and the random noise image, to determine an initial feature vector representation of the set of images and the random noise image; processing, with a first generator network of a series of generator networks including the first generator network and at least one further generator network, the initial feature vector representation, to generate image data associated with a generated image, the generated image being associated with a generated item different than each item of the plurality of items; processing, with each respective relation network of a series of relation networks corresponding to the series of generator networks, the set of images of the plurality of images and the generated image data from a corresponding generator network of the series of generator networks, to determine a further feature vector representation of the set of images and the generated image; and processing, with each respective generator network of the at least one further generator network, the further feature vector representation from a preceding relation network of the series of relation networks, to generate further image data associated with at least one further generated image, the at least one further generated image being associated with the generated item different than each item of the plurality of items.

In some non-limiting embodiments or aspects, the method further includes processing, with the first generator network of the series of generator networks, the initial feature vector representation and a vector representation of an item category, to generate the image data associated with the generated image; and processing, with each respective generator network of the at least one further generator network, the further feature vector representation from the preceding relation network of the series of relation networks and the representation of the item category, to generate the further image data associated with the at least one further generated image.

According to some non-limiting embodiments or aspects, provided is a computing system including: one or more processors programmed and/or configured to: obtain training data associated with a plurality of images and random noise data associated with a random noise image, each image of the plurality of images being associated with a single item of a plurality of items; train an adversarial network including a series of generator networks including a first generator network and at least one further generator network and a series of discriminator networks corresponding to the series of generator networks and including a first discriminator network and at least one further discriminator network by: process, with a first generator network of the series of generator networks, a representation of a set of images of the plurality of images and the random noise image, to generate generated image data associated with a generated image, the generated image being associated with a generated item different than each item of the plurality of items; process, with a first discriminator network of the series of discriminator networks, the generated image data, to determine a prediction of whether the generated item is real; process, with each respective further generator network of the at least one further generator network, a further representation of the set of images of the plurality of images and the generated image data from a preceding generator network of the series of generator networks, to generate further generated image data associated with at least one further generated image, the at least one further generated image being associated with the generated item different than each item of the plurality of items; and process, with each respective further discriminator network of the at least one further discriminator network, the further generated image data from a corresponding generator network of the series of generator networks, to determine at least one further prediction of whether the generated item is real; and modifying, using a loss function of the adversarial network that depends on (i) a compatibility score including a prediction of a compatibility of the set of images and the generated image, (ii) at least one further compatibility score including a prediction of a compatibility of the set of images and the at least one further generated image, (iii) the prediction, and (iv) the at least one further prediction, one or more parameters of the series of generator networks.

In some non-limiting embodiments or aspects, training the adversarial network includes: processing, with the first generator network of the series of generator networks, (a) the representation of the set of images of the plurality of images and the random noise image and (b) a representation of an item category, to generate the generated image data associated with the generated image; processing, with the first discriminator network of the series of discriminator networks, the generated image data and the representation of the item category, to determine the prediction, the prediction including predictions of (i) whether the generated item is real and (ii) whether the generated item is associated with the item category; processing, with each respective further generator network of the at least one further generator network, (a) the at least one further representation of the set of images of the plurality of images and the generated image data from the preceding generator network of the series of generator networks and (b) the representation of the item category, to generate the further generated image data associated with the at least one further generated image; and processing, with each respective further discriminator network of the at least one further discriminator network, the generated image data from the corresponding generator network of the series of generator networks and the representation of the item category, to determine the at least one further prediction, the at least one further prediction including predictions of (i) whether the generated item is real and (ii) whether the generated item is associated with the item category.

In some non-limiting embodiments or aspects, the set of images includes a subset of images of the plurality of images, and the generated item is associated with a same item category as an item of the plurality of items not included in a set of items associated with the set of images.

In some non-limiting embodiments or aspects, the set of images includes each image of the plurality of images, and the generated item is associated with a different item category than each item of the plurality of items.

In some non-limiting embodiments or aspects, training the adversarial network includes: processing, with a first relation network of a series of relation networks corresponding to the series of generator networks and including the first relation network and at least one further relation network, the set of images of the plurality of images and the generated image data from the first generator network of the series of generator networks, to determine the compatibility score including the prediction of the compatibility of the set of images and the generated image; processing, with each respective further relation network of the at least one further relation network, the set of images of the plurality of images and the further generated image data from a corresponding generator network of the series of generator networks, to determine the at least one further compatibility score including the prediction of the compatibility of the set of images and the at least one further generated image.

In some non-limiting embodiments or aspects, training the adversarial network includes: processing, with the first relation network of the series of relation networks, the set of images and the generated image, to determine a feature vector representation of the set of images and the generated image; processing, with each respective further relation network of the at least one further relation network, the set of images and the at least one further generated image, to determine at least one further feature vector representation of the set of images and the at least one further generated image; processing, with another relation network, the plurality of images, to determine another feature vector representation of the plurality of images; determining a first divergence between the feature vector representation and the another feature vector representation; determining at least one further divergence between each further feature vector representation of the at least one further feature vector representation and the another feature vector representation, the loss function of the adversarial network further depending on the divergence and the at least one further divergence.

In some non-limiting embodiments or aspects, training the adversarial network includes: processing, with an initial relation network, the set of images and the random noise image, to determine the representation of (a) the set of images of the plurality of images and (b) the random noise image as an initial feature vector representation of the set of images and the random noise image.

In some non-limiting embodiments or aspects, the one or more processors are further programmed and/or configured to: provide the series of generator networks including the one or more parameters that have been modified based on the loss function of the adversarial network; obtain input data associated with a further plurality of images and further random noise data associated with a further random noise image; and process, using the series of generator networks, the input data and the further random noise data to generate output data.

According to some non-limiting embodiments or aspects, provided is a computing system including: one or more processors programmed and/or configured to: obtain input data associated with a plurality of images and random noise data associated with a random noise image, each image of the plurality of images being associated with a single item of a plurality of items; process, with an initial relation network, a set of images of the plurality of images and the random noise image, to determine an initial feature vector representation of the set of images and the random noise image; process, with a first generator network of a series of generator networks including the first generator network and at least one further generator network, the initial feature vector representation, to generate image data associated with a generated image, the generated image being associated with a generated item different than each item of the plurality of items; process, with each respective relation network of a series of relation networks corresponding to the series of generator networks, the set of images of the plurality of images and the generated image data from a corresponding generator network of the series of generator networks, to determine a further feature vector representation of the set of images and the generated image; and process, with each respective generator network of the at least one further generator network, the further feature vector representation from a preceding relation network of the series of relation networks, to generate further image data associated with at least one further generated image, the at least one further generated image being associated with the generated item different than each item of the plurality of items.

In some non-limiting embodiments or aspects, the one or more processors are further programmed and/or configured to: process, with the first generator network of the series of generator networks, the initial feature vector representation and a vector representation of an item category, to generate the image data associated with the generated image; and process, with each respective generator network of the at least one further generator network, the further feature vector representation from the preceding relation network of the series of relation networks and the representation of the item category, to generate the further image data associated with the at least one further generated image.

According to some non-limiting embodiments or aspects, provided is a computer program product including at least one non-transitory computer-readable medium including program instructions that, when executed by at least one processor, cause the at least one processor to: obtain training data associated with a plurality of images and random noise data associated with a random noise image, each image of the plurality of images being associated with a single item of a plurality of items; train an adversarial network including a series of generator networks including a first generator network and at least one further generator network and a series of discriminator networks corresponding to the series of generator networks and including a first discriminator network and at least one further discriminator network by: process, with a first generator network of the series of generator networks, a representation of a set of images of the plurality of images and the random noise image, to generate generated image data associated with a generated image, the generated image being associated with a generated item different than each item of the plurality of items; process, with a first discriminator network of the series of discriminator networks, the generated image data, to determine a prediction of whether the generated item is real; process, with each respective further generator network of the at least one further generator network, a further representation of the set of images of the plurality of images and the generated image data from a preceding generator network of the series of generator networks, to generate further generated image data associated with at least one further generated image, the at least one further generated image being associated with the generated item different than each item of the plurality of items; and process, with each respective further discriminator network of the at least one further discriminator network, the further generated image data from a corresponding generator network of the series of generator networks, to determine at least one further prediction of whether the generated item is real; and modifying, using a loss function of the adversarial network that depends on (i) a compatibility score including a prediction of a compatibility of the set of images and the generated image, (ii) at least one further compatibility score including a prediction of a compatibility of the set of images and the at least one further generated image, (iii) the prediction, and (iv) the at least one further prediction, one or more parameters of the series of generator networks.

According to some non-limiting embodiments or aspects, provided is a computer program product including at least one non-transitory computer-readable medium including program instructions that, when executed by at least one processor, cause the at least one processor to: obtain input data associated with a plurality of images and random noise data associated with a random noise image, each image of the plurality of images being associated with a single item of a plurality of items; process, with an initial relation network, a set of images of the plurality of images and the random noise image, to determine an initial feature vector representation of the set of images and the random noise image; process, with a first generator network of a series of generator networks including the first generator network and at least one further generator network, the initial feature vector representation, to generate image data associated with a generated image, the generated image being associated with a generated item different than each item of the plurality of items; process, with each respective relation network of a series of relation networks corresponding to the series of generator networks, the set of images of the plurality of images and the generated image data from a corresponding generator network of the series of generator networks, to determine a further feature vector representation of the set of images and the generated image; and process, with each respective generator network of the at least one further generator network, the further feature vector representation from a preceding relation network of the series of relation networks, to generate further image data associated with at least one further generated image, the at least one further generated image being associated with the generated item different than each item of the plurality of items.

Further embodiments or aspects are set forth in the following numbered clauses:

Clause 1. A computer-implemented method comprising: obtaining, with at least one processor, training data associated with a plurality of images and random noise data associated with a random noise image, wherein each image of the plurality of images is associated with a single item of a plurality of items; training, with at least one processor, an adversarial network including a series of generator networks including a first generator network and at least one further generator network and a series of discriminator networks corresponding to the series of generator networks and including a first discriminator network and at least one further discriminator network by: processing, with a first generator network of the series of generator networks, a representation of a set of images of the plurality of images and the random noise image, to generate generated image data associated with a generated image, wherein the generated image is associated with a generated item different than each item of the plurality of items; processing, with a first discriminator network of the series of discriminator networks, the generated image data, to determine a prediction of whether the generated item is real; processing, with each respective further generator network of the at least one further generator network, a further representation of the set of images of the plurality of images and the generated image data from a preceding generator network of the series of generator networks, to generate further generated image data associated with at least one further generated image, wherein the at least one further generated image is associated with the generated item different than each item of the plurality of items; and processing, with each respective further discriminator network of the at least one further discriminator network, the further generated image data from a corresponding generator network of the series of generator networks, to determine at least one further prediction of whether the generated item is real; and modifying, using a loss function of the adversarial network that depends on (i) a compatibility score including a prediction of a compatibility of the set of images and the generated image, (ii) at least one further compatibility score including a prediction of a compatibility of the set of images and the at least one further generated image, (iii) the prediction, and (iv) the at least one further prediction, one or more parameters of the series of generator networks.

Clause 2. The computer-implemented method of clause 1, wherein training the adversarial network includes: processing, with the first generator network of the series of generator networks, (a) the representation of the set of images of the plurality of images and the random noise image and (b) a representation of an item category, to generate the generated image data associated with the generated image; processing, with the first discriminator network of the series of discriminator networks, the generated image data and the representation of the item category, to determine the prediction, wherein the prediction includes predictions of (i) whether the generated item is real and (ii) whether the generated item is associated with the item category; processing, with each respective further generator network of the at least one further generator network, (a) the at least one further representation of the set of images of the plurality of images and the generated image data from the preceding generator network of the series of generator networks and (b) the representation of the item category, to generate the further generated image data associated with the at least one further generated image; and processing, with each respective further discriminator network of the at least one further discriminator network, the generated image data from the corresponding generator network of the series of generator networks and the representation of the item category, to determine the at least one further prediction, wherein the at least one further prediction includes predictions of (i) whether the generated item is real and (ii) whether the generated item is associated with the item category.

Clause 3. The computer-implemented method of any of clauses 1 and 2, wherein the set of images includes a subset of images of the plurality of images, and wherein the generated item is associated with a same item category as an item of the plurality of items not included in a set of items associated with the set of images.

Clause 4. The computer-implemented method of any of clauses 1-3, wherein the set of images includes each image of the plurality of images, and wherein the generated item is associated with a different item category than each item of the plurality of items.

Clause 5. The computer-implemented method of any of clauses 1-4, wherein training the adversarial network includes: processing, with a first relation network of a series of relation networks corresponding to the series of generator networks and including the first relation network and at least one further relation network, the set of images of the plurality of images and the generated image data from the first generator network of the series of generator networks, to determine the compatibility score including the prediction of the compatibility of the set of images and the generated image; processing, with each respective further relation network of the at least one further relation network, the set of images of the plurality of images and the further generated image data from a corresponding generator network of the series of generator networks, to determine the at least one further compatibility score including the prediction of the compatibility of the set of images and the at least one further generated image.

Clause 6. The computer-implemented method of any of clauses 1-5, wherein training the adversarial network includes: processing, with the first relation network of the series of relation networks, the set of images and the generated image, to determine a feature vector representation of the set of images and the generated image; processing, with each respective further relation network of the at least one further relation network, the set of images and the at least one further generated image, to determine at least one further feature vector representation of the set of images and the at least one further generated image; processing, with another relation network, the plurality of images, to determine another feature vector representation of the plurality of images; determining a first divergence between the feature vector representation and the another feature vector representation; determining at least one further divergence between each further feature vector representation of the at least one further feature vector representation and the another feature vector representation, wherein the loss function of the adversarial network further depends on the divergence and the at least one further divergence.

Clause 7. The computer-implemented method of any of clauses 1-6, wherein training the adversarial network includes: processing, with an initial relation network, the set of images and the random noise image, to determine the representation of (a) the set of images of the plurality of images and (b) the random noise image as an initial feature vector representation of the set of images and the random noise image.

Clause 8. The computer-implemented method of any of clauses 1-7, further comprising: providing, with at least one processor, the series of generator networks including the one or more parameters that have been modified based on the loss function of the adversarial network; obtaining, with at least one processor, input data associated with a further plurality of images and further random noise data associated with a further random noise image; and processing, with at least one processor using the series of generator networks, the input data and the further random noise data to generate output data.

Clause 9. A computer-implemented method comprising: obtaining, with at least one processor, input data associated with a plurality of images and random noise data associated with a random noise image, wherein each image of the plurality of images is associated with a single item of a plurality of items; processing, with an initial relation network, a set of images of the plurality of images and the random noise image, to determine an initial feature vector representation of the set of images and the random noise image; processing, with a first generator network of a series of generator networks including the first generator network and at least one further generator network, the initial feature vector representation, to generate image data associated with a generated image, wherein the generated image is associated with a generated item different than each item of the plurality of items; processing, with each respective relation network of a series of relation networks corresponding to the series of generator networks, the set of images of the plurality of images and the generated image data from a corresponding generator network of the series of generator networks, to determine a further feature vector representation of the set of images and the generated image; and processing, with each respective generator network of the at least one further generator network, the further feature vector representation from a preceding relation network of the series of relation networks, to generate further image data associated with at least one further generated image, wherein the at least one further generated image is associated with the generated item different than each item of the plurality of items.

Clause 10. The computer-implemented method of clause 9, further comprising: processing, with the first generator network of the series of generator networks, the initial feature vector representation and a vector representation of an item category, to generate the image data associated with the generated image; and processing, with each respective generator network of the at least one further generator network, the further feature vector representation from the preceding relation network of the series of relation networks and the representation of the item category, to generate the further image data associated with the at least one further generated image.

Clause 11. A computing system comprising: one or more processors programmed and/or configured to: obtain training data associated with a plurality of images and random noise data associated with a random noise image, wherein each image of the plurality of images is associated with a single item of a plurality of items; train an adversarial network including a series of generator networks including a first generator network and at least one further generator network and a series of discriminator networks corresponding to the series of generator networks and including a first discriminator network and at least one further discriminator network by: process, with a first generator network of the series of generator networks, a representation of a set of images of the plurality of images and the random noise image, to generate generated image data associated with a generated image, wherein the generated image is associated with a generated item different than each item of the plurality of items; process, with a first discriminator network of the series of discriminator networks, the generated image data, to determine a prediction of whether the generated item is real; process, with each respective further generator network of the at least one further generator network, a further representation of the set of images of the plurality of images and the generated image data from a preceding generator network of the series of generator networks, to generate further generated image data associated with at least one further generated image, wherein the at least one further generated image is associated with the generated item different than each item of the plurality of items; and process, with each respective further discriminator network of the at least one further discriminator network, the further generated image data from a corresponding generator network of the series of generator networks, to determine at least one further prediction of whether the generated item is real; and modifying, using a loss function of the adversarial network that depends on (i) a compatibility score including a prediction of a compatibility of the set of images and the generated image, (ii) at least one further compatibility score including a prediction of a compatibility of the set of images and the at least one further generated image, (iii) the prediction, and (iv) the at least one further prediction, one or more parameters of the series of generator networks.

Clause 12. The system of clause 11, wherein training the adversarial network includes: processing, with the first generator network of the series of generator networks, (a) the representation of the set of images of the plurality of images and the random noise image and (b) a representation of an item category, to generate the generated image data associated with the generated image; processing, with the first discriminator network of the series of discriminator networks, the generated image data and the representation of the item category, to determine the prediction, wherein the prediction includes predictions of (i) whether the generated item is real and (ii) whether the generated item is associated with the item category; processing, with each respective further generator network of the at least one further generator network, (a) the at least one further representation of the set of images of the plurality of images and the generated image data from the preceding generator network of the series of generator networks and (b) the representation of the item category, to generate the further generated image data associated with the at least one further generated image; and processing, with each respective further discriminator network of the at least one further discriminator network, the generated image data from the corresponding generator network of the series of generator networks and the representation of the item category, to determine the at least one further prediction, wherein the at least one further prediction includes predictions of (i) whether the generated item is real and (ii) whether the generated item is associated with the item category.

Clause 13. The system of any of clauses 11 and 12, wherein the set of images includes a subset of images of the plurality of images, and wherein the generated item is associated with a same item category as an item of the plurality of items not included in a set of items associated with the set of images.

Clause 14. The system of any of clauses 11-13, wherein the set of images includes each image of the plurality of images, and wherein the generated item is associated with a different item category than each item of the plurality of items.

Clause 15. The system of any of clauses 11-14, wherein training the adversarial network includes: processing, with a first relation network of a series of relation networks corresponding to the series of generator networks and including the first relation network and at least one further relation network, the set of images of the plurality of images and the generated image data from the first generator network of the series of generator networks, to determine the compatibility score including the prediction of the compatibility of the set of images and the generated image; processing, with each respective further relation network of the at least one further relation network, the set of images of the plurality of images and the further generated image data from a corresponding generator network of the series of generator networks, to determine the at least one further compatibility score including the prediction of the compatibility of the set of images and the at least one further generated image.

Clause 16. The system of any of clauses 11-15, wherein training the adversarial network includes: processing, with the first relation network of the series of relation networks, the set of images and the generated image, to determine a feature vector representation of the set of images and the generated image; processing, with each respective further relation network of the at least one further relation network, the set of images and the at least one further generated image, to determine at least one further feature vector representation of the set of images and the at least one further generated image; processing, with another relation network, the plurality of images, to determine another feature vector representation of the plurality of images; determining a first divergence between the feature vector representation and the another feature vector representation; determining at least one further divergence between each further feature vector representation of the at least one further feature vector representation and the another feature vector representation, wherein the loss function of the adversarial network further depends on the divergence and the at least one further divergence.

Clause 17. The system of any of clauses 11-16, wherein training the adversarial network includes: processing, with an initial relation network, the set of images and the random noise image, to determine the representation of (a) the set of images of the plurality of images and (b) the random noise image as an initial feature vector representation of the set of images and the random noise image.

Clause 18. The system of any of clauses 11-17, wherein the one or more processors are further programmed and/or configured to: provide the series of generator networks including the one or more parameters that have been modified based on the loss function of the adversarial network; obtain input data associated with a further plurality of images and further random noise data associated with a further random noise image; and process, using the series of generator networks, the input data and the further random noise data to generate output data.

Clause 19. A computing system comprising: one or more processors programmed and/or configured to: obtain input data associated with a plurality of images and random noise data associated with a random noise image, wherein each image of the plurality of images is associated with a single item of a plurality of items; process, with an initial relation network, a set of images of the plurality of images and the random noise image, to determine an initial feature vector representation of the set of images and the random noise image; process, with a first generator network of a series of generator networks including the first generator network and at least one further generator network, the initial feature vector representation, to generate image data associated with a generated image, wherein the generated image is associated with a generated item different than each item of the plurality of items; process, with each respective relation network of a series of relation networks corresponding to the series of generator networks, the set of images of the plurality of images and the generated image data from a corresponding generator network of the series of generator networks, to determine a further feature vector representation of the set of images and the generated image; and process, with each respective generator network of the at least one further generator network, the further feature vector representation from a preceding relation network of the series of relation networks, to generate further image data associated with at least one further generated image, wherein the at least one further generated image is associated with the generated item different than each item of the plurality of items.

Clause 20. The computing system of clause 19, wherein the one or more processors are further programmed and/or configured to: process, with the first generator network of the series of generator networks, the initial feature vector representation and a vector representation of an item category, to generate the image data associated with the generated image; and process, with each respective generator network of the at least one further generator network, the further feature vector representation from the preceding relation network of the series of relation networks and the representation of the item category, to generate the further image data associated with the at least one further generated image.

These and other features and characteristics of the present disclosure, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of limits. As used in the specification and the claims, the singular form of "a," "an," and "the" include plural referents unless the context clearly dictates otherwise.

BRIEF DESCRIPTION OF THE DRAWINGS

Additional advantages and details are explained in greater detail below with reference to the exemplary embodiments or aspects that are illustrated in the accompanying schematic figures, in which.

DESCRIPTION

Figure 1:
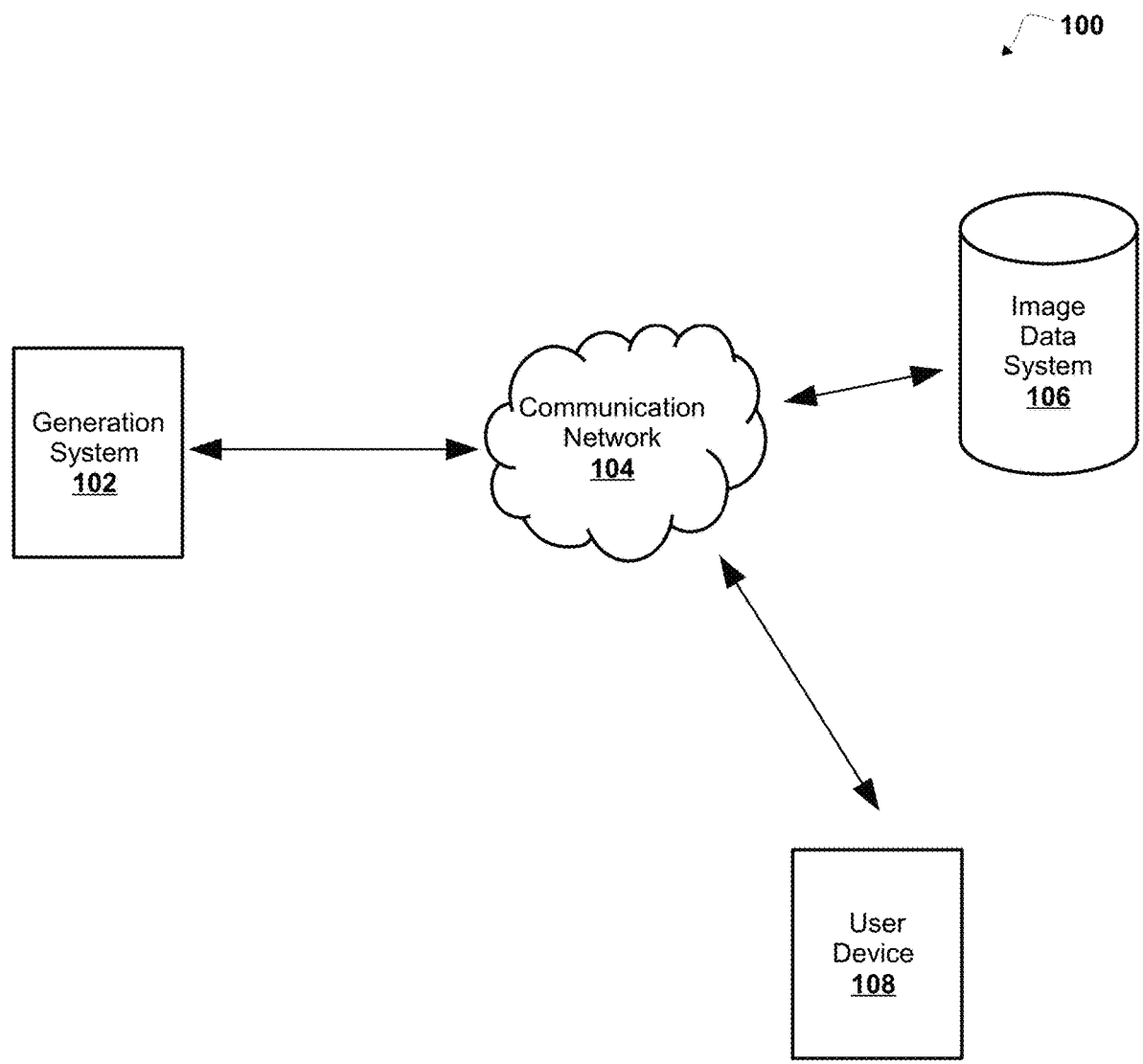
FIG. 1 is a diagram of non-limiting embodiments or aspects of an environment in which systems, devices, products, apparatus, and/or methods, described herein, may be implemented.

It is to be understood that the present disclosure may assume various alternative variations and step sequences, except where expressly specified to the contrary. It is also to be understood that the specific devices and processes illustrated in the attached drawings, and described in the following specification, are simply exemplary and non-limiting embodiments or aspects. Hence, specific dimensions and other physical characteristics related to the embodiments or aspects disclosed herein are not to be considered as limiting.

No aspect, component, element, structure, act, step, function, instruction, and/or the like used herein should be construed as critical or essential unless explicitly described as such. Also, as used herein, the articles "a" and "an" are intended to include one or more items, and may be used interchangeably with "one or more" and "at least one." Furthermore, as used herein, the term "set" is intended to include one or more items (e.g., related items, unrelated items, a combination of related and unrelated items, etc.) and may be used interchangeably with "one or more" or "at least one." Where only one item is intended, the term "one" or similar language is used. Also, as used herein, the terms "has," "have," "having," or the like are intended to be open-ended terms. Further, the phrase "based on" is intended to mean "based at least partially on" unless explicitly stated otherwise.

As used herein, the terms "communication" and "communicate" refer to the receipt or transfer of one or more signals, messages, commands, or other type of data. For one unit (e.g., any device, system, or component thereof) to be in communication with another unit means that the one unit is able to directly or indirectly receive data from and/or transmit data to the other unit. This may refer to a direct or indirect connection that is wired and/or wireless in nature. Additionally, two units may be in communication with each other even though the data transmitted may be modified, processed, relayed, and/or routed between the first and second unit. For example, a first unit may be in communication with a second unit even though the first unit passively receives data and does not actively transmit data to the second unit. As another example, a first unit may be in communication with a second unit if an intermediary unit processes data from one unit and transmits processed data to the second unit. It will be appreciated that numerous other arrangements are possible.

It will be apparent that systems and/or methods, described herein, can be implemented in different forms of hardware, software, or a combination of hardware and software. The actual specialized control hardware or software code used to implement these systems and/or methods is not limiting of the implementations. Thus, the operation and behavior of the systems and/or methods are described herein without reference to specific software code, it being understood that software and hardware can be designed to implement the systems and/or methods based on the description herein.

Some non-limiting embodiments or aspects are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

As used herein, the term "mobile device" may refer to one or more portable electronic devices configured to communicate with one or more networks. As an example, a mobile device may include a cellular phone (e.g., a smartphone or standard cellular phone), a portable computer (e.g., a tablet computer, a laptop computer, etc.), a wearable device (e.g., a watch, pair of glasses, lens, clothing, and/or the like), a personal digital assistant (PDA), and/or other like devices. The terms "client device" and "user device," as used herein, refer to any electronic device that is configured to communicate with one or more servers or remote devices and/or systems. A client device or user device may include a mobile device, a network-enabled appliance (e.g., a network-enabled television, refrigerator, thermostat, and/or the like), a computer, a POS system, and/or any other device or system capable of communicating with a network.

As used herein, the term "computing device" or "computing system" may refer to one or more electronic devices that are configured to directly or indirectly communicate with or over one or more networks. The computing device may be a mobile device, a desktop computer, or the like. Furthermore, the term "computer" may refer to any computing device that includes the necessary components to receive, process, and output data, and normally includes a display, a processor, a memory, an input device, and a network interface. An "application" or "application program interface" (API) refers to computer code or other data sorted on a computer-readable medium that may be executed by a processor to facilitate the interaction between software components, such as a client-side front-end and/or server-side back-end for receiving data from the client. An "interface" refers to a generated display, such as one or more graphical user interfaces (GUIs) with which a user may interact, either directly or indirectly (e.g., through a keyboard, mouse, touchscreen, etc.).

As used herein, the term "server" may refer to or include one or more processors or computers, storage devices, or similar computer arrangements that are operated by or facilitate communication and processing for multiple parties in a network environment, such as the Internet, although it will be appreciated that communication may be facilitated over one or more public or private network environments and that various other arrangements are possible. Further, multiple computers, e.g., servers, or other computerized devices, such as POS devices, directly or indirectly communicating in the network environment may constitute a "system," such as a merchant's POS system.

Provided are improved systems, devices, products, apparatus, and/or methods for generating new items compatible with given items.

A Generative Adversarial Network (GAN) can train deep generative models using a minimax game. To generate samples or examples for training, a generator network maps a random noise vector z into a high dimensional output y (e.g., an image, etc.) via a relation network y=G(z, $\Theta_G$). The generator network G is trained to fool a discriminator network, D(y, $\Theta_D$), which tries to discriminate between generated samples (e.g., negative samples, etc.) and real samples (e.g., positive samples, etc.). The GAN minimax game can be written as the following Equation (1):

$$\min_{\theta_G} \max_{\theta_D} \mathcal{L}_{GAN}(\hat{y}, z, \theta_D, \theta_G) = \qquad (1)$$
$$\mathbb{E}_{\hat{y} \sim p_y} \log(D(\hat{y}, \theta_D)) + \mathbb{E}_{z \sim p(z)} \log(1 - D(G(z, \theta_G), \theta_D))$$

In Equation (1), the first term $\mathbb{E}_{\hat{y} \sim p(z)} \log(D(\hat{y}, \Theta_D))$ sums over the positive samples (e.g., positive training examples, etc.) for the discriminator network, and the second term $\mathbb{E}_{\hat{y} \sim p(z)} \log(1 - D(G(z, \Theta_G), \Theta_D))$ sums over the negative samples (e.g., negative training examples, etc.), which are generated by the generator network by sampling from the noise prior. Learning in a GAN is an iterative process which alternates between optimizing the loss $L_{GAN}(\hat{y}, Z, \Theta D, \Theta G)$ with respect to the discriminator parameters $\Theta D$ of the discriminator network D(y, $\Theta_D$) and the generator parameters $\Theta_G$ of the generator network G(z, $\Theta_G$), respectively. The discriminator network estimates the ratio of the data distribution $p_d(y)$ and the generated distribution $p_g(y)$: $D^*_G(y) = p_d(y)/(p_d(y) + p_g(y))$. A global minimum of the training criterion (e.g., an equilibrium, etc.) is where the two probability distributions are identical (e.g., $p_g = p_d$, $D^*_G(y) = \frac{1}{2}$). In some cases, a global minimum may be provided. However, the gradients with respect to $\Theta_G$ do not depend on f directly, but only implicitly through the current estimate of $\Theta_D$. In this way, the generator network G(z, $\Theta_G$) can produce any samples from the data distribution, which prevents learning of input-output relations that may be otherwise included in supervised training.

A method for progressive growing of GANs is described by Karras, Tero, et al. "Progressive Growing of GANs for Improved Quality, Stability, and Variation." arXiv preprint arXiv:1710.10196 (2017), the entire contents of which is hereby incorporated by reference. This existing method employs multiple generator networks and multiple discriminator networks, and each generator network uses the output of the previous generator network to create a higher resolution image. For example, the first generator network $G_1$ may create 4×4 pixel images, the second generator network $G_2$ may generate 8×8 pixel images, and so on. However, this existing method for progressive growing of GANs generates a single image by learning a single distribution (e.g., this existing method can only generate a single item that looks like data from a dataset, etc.), and directly passes a simple noise vector as input to generator $G_1$, as well as directly passes a generated image $\tilde{x}_{G_i}$ (i.e., the image generated by generator $G_i$) as input to generator $G_{i+1}$ (e.g., this existing method cannot capture a distribution or style that exists in an existing set of items, such as a fashion style that exists in an existing outfit, etc.). In this way, existing progressive growing of GANs cannot use an existing set of items as input and design a new or novel item that is compatible with the existing set of items.

Non-limiting embodiments or aspects of the present disclosure are directed to systems, devices, products, apparatus, and/or methods that obtain training data associated with a plurality of images and random noise data associated with a random noise image, wherein each image of the plurality of images is associated with a single item of a plurality of items; and train an adversarial network including a series of generator networks including a first generator network and at least one further generator network and a series of discriminator networks corresponding to the series of generator networks and including a first discriminator network and at least one further discriminator network by: processing, with a first generator network of the series of generator networks, a representation of a set of images of the plurality of images and the random noise image, to generate generated image data associated with a generated image, wherein the generated image is associated with a generated item different than each item of the plurality of items; processing, with a first discriminator network of the series of discriminator networks, the generated image data, to determine a prediction of whether the generated item is real; processing, with each respective further generator network of the at least one further generator network, a further representation of the set of images of the plurality of images and the generated image data from a preceding generator network of the series of generator networks, to generate further generated image data associated with at least one further generated image, wherein the at least one further generated image is associated with the generated item different than each item of the plurality of items; and processing, with each respective further discriminator network of the at least one further discriminator network, the further generated image data from a corresponding generator network of the series of generator networks, to determine at least one further prediction of whether the generated item is real; and modifying, using a loss function of the adversarial network that depends on (i) a compatibility score including a prediction of a compatibility of the set of images and the generated image, (ii) at least one further compatibility score including a prediction of a compatibility of the set of images and the at least one further generated image, (iii) the prediction, and (iv) the at least one further prediction, one or more parameters of the series of generator networks.

Additionally, or alternatively, non-limiting embodiments or aspects of the present disclosure are directed to systems, devices, products, apparatus, and/or methods that obtain input data associated with a plurality of images and random noise data associated with a random noise image, wherein each image of the plurality of images is associated with a single item of a plurality of items; process, with an initial relation network, a set of images of the plurality of images and the random noise image, to determine an initial feature vector representation of the set of images and the random noise image; process, with a first generator network of a series of generator networks including the first generator network and at least one further generator network, the initial feature vector representation, to generate image data associated with a generated image, wherein the generated image is associated with a generated item different than each item of the plurality of items; process, with each respective relation network of a series of relation networks corresponding to the series of generator networks, the set of images of the plurality of images and the generated image data from a corresponding generator network of the series of generator networks, to determine a further feature vector representation of the set of images and the generated image; and process, with each respective generator network of the at least one further generator network, the further feature vector representation from a preceding relation network of the series of relation networks, to generate further image data associated with at least one further generated image, wherein the at least one further generated image is associated with the generated item different than each item of the plurality of items.

In this way, non-limiting embodiments or aspects may generate a completely new item instead of simply retrieving an existing item, as well as ensure compatibility of the new item by learning the style of existing items and creating a new item consistent with that style, which enables creating novel designs (e.g., fashion designs, etc.), providing personalized recommendations, building virtual set (e.g., outfit, etc.) generation, allowing users modify existing items, and/or the like. For example, a user may provide a set of images of existing items (e.g., images of jeans, a t-shirt, a jacket, etc.) and a category of a new item (e.g. shoes, etc.), and non-limiting embodiments or aspects of the present disclosure may automatically extract visual features of the entire set of the provided items and generate a new image of the requested category of item (e.g., shoes, etc.) and, moreover, the new item may be compatible in style and visual appearance with the provided existing items, which enables use in a fashion recommendation system or a tool for creating new fashion designs to inspire the designers, fashion experts, or users.

Referring now to FIG. 1, FIG. 1 is a diagram of an example environment 100 in which systems, devices, products, apparatus, and/or methods, described herein, may be implemented. As shown in FIG. 1, environment 100 includes generation system 102, communication network 104, image data system 106, and user device 108. Systems and/or devices of environment 100 may interconnect via wired connections, wireless connections, or a combination of wired and wireless connections. For example, systems and/or devices of environment 100 may interconnect and/or communicate data and/or information (e.g., image data, text data, compatibility scores, prediction scores, item categories, etc.) via communication network 104.

Generation system 102 may include one or more devices capable of generating new items compatible with given items. For example, generation system 102 may include one or more devices capable of obtaining training data associated with a plurality of images and random noise data associated with a random noise image, each image of the plurality of images being associated with a single item of a plurality of items; and training an adversarial network including a series of generator networks including a first generator network and at least one further generator network and a series of discriminator networks corresponding to the series of generator networks and including a first discriminator network and at least one further discriminator network by: processing, with a first generator network of the series of generator networks, a representation of a set of images of the plurality of images and the random noise image, to generate generated image data associated with a generated image, the generated image being associated with a generated item different than each item of the plurality of items; processing, with a first discriminator network of the series of discriminator networks, the generated image data, to determine a prediction of whether the generated item is real; processing, with each respective further generator network of the at least one further generator network, a further representation of the set of images of the plurality of images and the generated image data from a preceding generator network of the series of generator networks, to generate further generated image data associated with at least one further generated image, the at least one further generated image being associated with the generated item different than each item of the plurality of items; and processing, with each respective further discriminator network of the at least one further discriminator network, the further generated image data from a corresponding generator network of the series of generator networks, to determine at least one further prediction of whether the generated item is real; and modifying, using a loss function of the adversarial network that depends on (i) a compatibility score including a prediction of a compatibility of the set of images and the generated image, (ii) at least one further compatibility score including a prediction of a compatibility of the set of images and the at least one further generated image, (iii) the prediction, and (iv) the at least one further prediction, one or more parameters of the series of generator networks.

Additionally, or alternatively, generation system 102 may include one or more devices capable of obtaining input data associated with a plurality of images and random noise data associated with a random noise image, each image of the plurality of images being associated with a single item of a plurality of items; processing, with an initial relation network, a set of images of the plurality of images and the random noise image, to determine an initial feature vector representation of the set of images and the random noise image; processing, with a first generator network of a series of generator networks including the first generator network and at least one further generator network, the initial feature vector representation, to generate image data associated with a generated image, the generated image being associated with a generated item different than each item of the plurality of items; processing, with each respective relation network of a series of relation networks corresponding to the series of generator networks, the set of images of the plurality of images and the generated image data from a corresponding generator network of the series of generator networks, to determine a further feature vector representation of the set of images and the generated image; and processing, with each respective generator network of the at least one further generator network, the further feature vector representation from a preceding relation network of the series of relation networks, to generate further image data associated with at least one further generated image, the at least one further generated image being associated with the generated item different than each item of the plurality of items.

In some non-limiting embodiments, an image includes a matrix (e.g., a grid, a rectangular array, a multi-dimensional grid, a multi-dimensional array, a set of rows and columns, etc.) that has a plurality of elements (e.g., units, cells, pixels, etc.). Each element of the matrix may include image data (e.g., a value of image data, etc.) associated with the image. In some non-limiting embodiments, each element of an image is associated with three dimensions. For example, a first dimension of the element is a width of the element, a second dimension of the element is a length of the element, and a third dimension is a value associated with the image data of the element, such as a pixel value, and/or the like (e.g., a red value, a green value, a blue value, an intensity value, a chroma value, a luma value, etc.).

Communication network 104 may include one or more wired and/or wireless networks. For example, communication network 104 may include a cellular network (e.g., a long-term evolution (LTE) network, a third generation (3G) network, a fourth generation (4G) network, a code division multiple access (CDMA) network, etc.), a public land mobile network (PLMN), a local area network (LAN), a wide area network (WAN), a metropolitan area network (MAN), a telephone network (e.g., the public switched telephone network (PSTN)), a private network, an ad hoc network, an intranet, the Internet, a fiber optic-based network, a cloud computing network, and/or the like, and/or a combination of these or other types of networks.

Image data system 106 may include one or more devices capable of storing and/or providing image data associated with images including items. For example, image data system 106 may provide or make available one or more websites and/or one or more databases from which images of items are available for retrieval, and generation system 102 may web crawl the one or more websites and/or query the one or more databases to retrieve the images to create a dataset of image data. As an example, one or more of the images may be associated with an indication that a set of multiple items in the one or more images is compatible. In such an example, image data system 106 may include a fashion website (e.g., Polyvore, Chictopia, Shoplook, etc.) from which images that each include a single clothing item (e.g., a shirt, a skirt, a hat, a purse, etc.) can be retrieved and/or generated, and a fashion outfit including each clothing item may be associated with an indication that the set of multiple clothing items in the fashion outfit is compatible. In such an example, one or more of the images may be associated with an indication that the image is a real image (e.g., a non-generated image, a non-fake image, etc.). However, non-limiting embodiments or aspects are not limited thereto, and an item in an image may include any type of item, such as a clothing item, a furniture item, a landscaping item, a graphical user interface item, an architectural item, an artwork item, and/or the like.

User device 108 may include a client device and/or the like. For example, user device 108 may be associated with a user or a consumer. In some non-limiting embodiments or aspects, user device 108 can receive information associated with one or more generated images from generation system 102 and/or image data system 106. As an example, generation system 102 can receive images of items from the user, and generate, for a user of user device 108, images of new or novel items that are compatible with the items received from the user.

The number and arrangement of devices and systems shown in FIG. 1 are provided as an example. There may be additional devices and/or systems, fewer devices and/or systems, different devices and/or systems, or differently arranged devices and/or systems than those shown in FIG. 1. Furthermore, two or more devices and/or systems shown in FIG. 1 may be implemented within a single device and/or system, or a single device and/or system shown in FIG. 1 may be implemented as multiple, distributed devices and/or systems. Additionally or alternatively, a set of devices and/or systems (e.g., one or more devices, one or more systems, etc.) may perform one or more functions described as being performed by another set of devices and/or systems.

Figure 2:
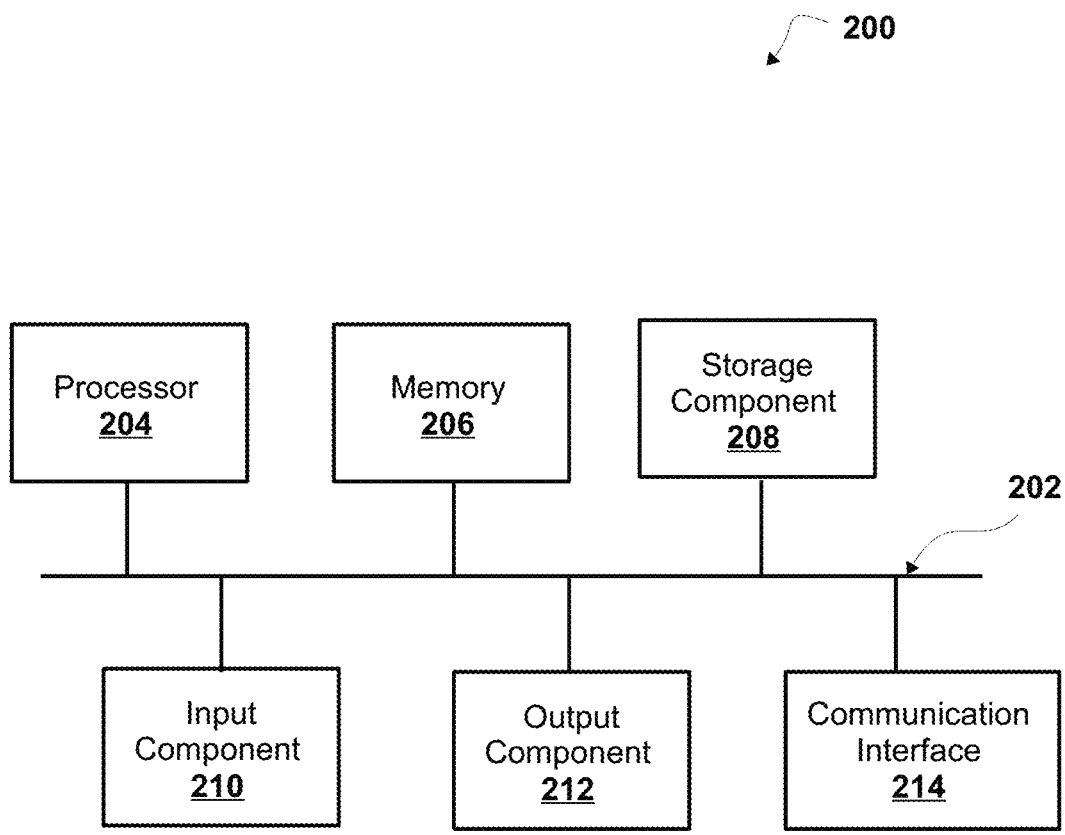
FIG. 2 is a diagram of non-limiting embodiments or aspects of components of one or more devices and/or one or more systems of FIG. 1.

Referring now to FIG. 2, shown is a diagram of example components of a device 200 according to non-limiting embodiments or aspects. Device 200 may correspond to one or more devices of generation system 102, communication network 104, image data system 106, and/or user device 108. In some non-limiting embodiments or aspects, generation system 102, communication network 104, image data system 106, and/or user device 108 may include at least one device 200 and/or at least one component of device 200. The number and arrangement of components shown in FIG. 2 are provided as an example. In some non-limiting embodiments or aspects, device 200 may include additional components, fewer components, different components, or differently arranged components than those shown in FIG. 2. Additionally or alternatively, a set of components (e.g., one or more components) of device 200 may perform one or more functions described as being performed by another set of components of device 200.

As shown in FIG. 2, device 200 may include a bus 202, a processor 204, memory 206, a storage component 208, an input component 210, an output component 212, and a communication interface 214. Bus 202 may include a component that permits communication among the components of device 200. In some non-limiting embodiments, processor 204 may be implemented in hardware, firmware, or a combination of hardware and software. For example, processor 204 may include a processor (e.g., a central processing unit (CPU), a graphics processing unit (GPU), an accelerated processing unit (APU), etc.), a microprocessor, a digital signal processor (DSP), and/or any processing component (e.g., a field-programmable gate array (FPGA), an application-specific integrated circuit (ASIC), etc.) that can be programmed to perform a function. Memory 206 may include random access memory (RAM), read-only memory (ROM), and/or another type of dynamic or static storage device (e.g., flash memory, magnetic memory, optical memory, etc.) that stores information and/or instructions for use by processor 204.

With continued reference to FIG. 2, storage component 208 may store information and/or software related to the operation and use of device 200. For example, storage component 208 may include a hard disk (e.g., a magnetic disk, an optical disk, a magneto-optic disk, a solid state disk, etc.) and/or another type of computer-readable medium. Input component 210 may include a component that permits device 200 to receive information, such as via user input (e.g., a touch screen display, a keyboard, a keypad, a mouse, a button, a switch, a microphone, etc.). Additionally, or alternatively, input component 210 may include a sensor for sensing information (e.g., a global positioning system (GPS) component, an accelerometer, a gyroscope, an actuator, etc.). Output component 212 may include a component that provides output information from device 200 (e.g., a display, a speaker, one or more light-emitting diodes (LEDs), etc.). Communication interface 214 may include a transceiver-like component (e.g., a transceiver, a separate receiver and transmitter, etc.) that enables device 200 to communicate with other devices, such as via a wired connection, a wireless connection, or a combination of wired and wireless connections. Communication interface 214 may permit device 200 to receive information from another device and/or provide information to another device. For example, communication interface 214 may include an Ethernet interface, an optical interface, a coaxial interface, an infrared interface, a radio frequency (RF) interface, a universal serial bus (USB) interface, a Wi-Fi® interface, a cellular network interface, and/or the like.

Device 200 may perform one or more processes described herein. Device 200 may perform these processes based on processor 204 executing software instructions stored by a computer-readable medium, such as memory 206 and/or storage component 208. A computer-readable medium may include any non-transitory memory device. A memory device includes memory space located inside of a single physical storage device or memory space spread across multiple physical storage devices. Software instructions may be read into memory 206 and/or storage component 208 from another computer-readable medium or from another device via communication interface 214. When executed, software instructions stored in memory 206 and/or storage component 208 may cause processor 204 to perform one or more processes described herein. Additionally or alternatively, hardwired circuitry may be used in place of or in combination with software instructions to perform one or more processes described herein. Thus, embodiments described herein are not limited to any specific combination of hardware circuitry and software. The term "programmed and/or configured," as used herein, refers to an arrangement of software, hardware circuitry, or any combination thereof on one or more devices.

Figure 3:
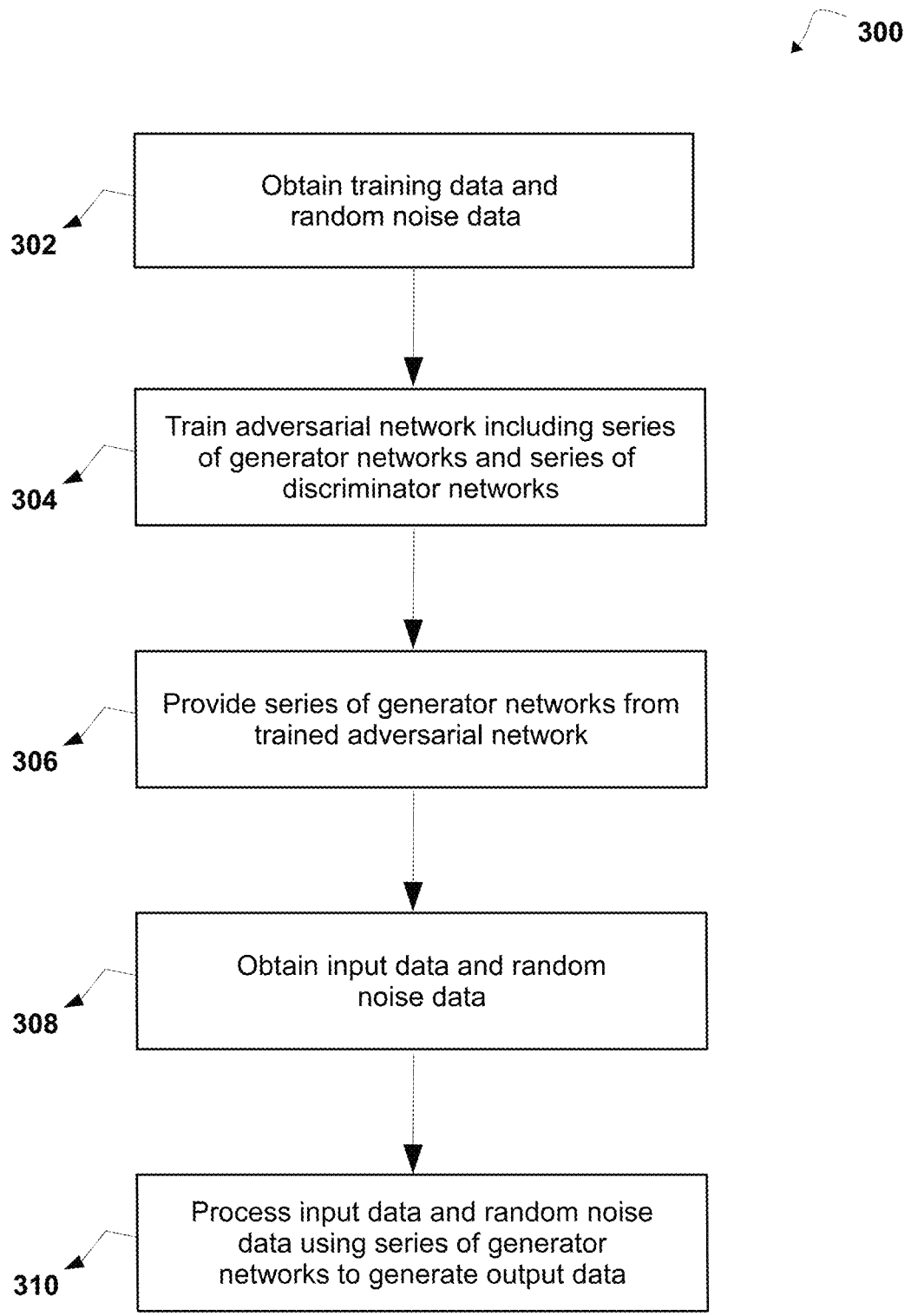
FIG. 3 is a flowchart of non-limiting embodiments or aspects of a process for generating new items compatible with existing items.

Referring now to FIG. 3, FIG. 3 is a flowchart of non-limiting embodiments or aspects of a process 300 for generating new items compatible with given items. In some non-limiting embodiments or aspects, one or more of the steps of process 300 are performed (e.g., completely, partially, etc.) by generation system 102 (e.g., one or more devices of generation system 102, etc.). In some non-limiting embodiments or aspects, one or more of the steps of process 300 are performed (e.g., completely, partially, etc.) by another device or a group of devices separate from or including generation system 102, such as image data system 106 (e.g., one or more devices of image data system 106, etc.), user device 108 (e.g., one or more devices of a system of user device 108, etc.), and/or the like.

As shown in FIG. 3, at step 302, process 300 includes obtaining training data and random noise data. For example, generation system 102 may obtain training data and random noise data. As an example, generation system 102 may obtain training data associated with a plurality of images and random noise data associated with a random noise image. In such an example, each image of the plurality of images may be associated with a single item of a plurality of items.

Figure 4:
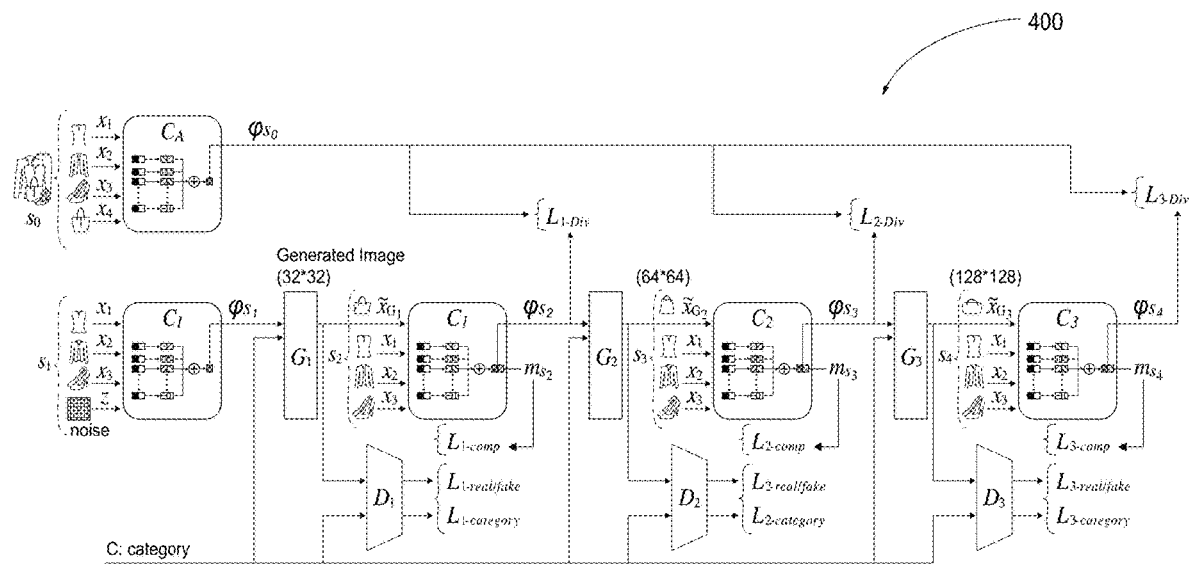
FIG. 4 is a diagram of non-limiting embodiments or aspects of a process for generating new items compatible with existing items.
Figure 5:
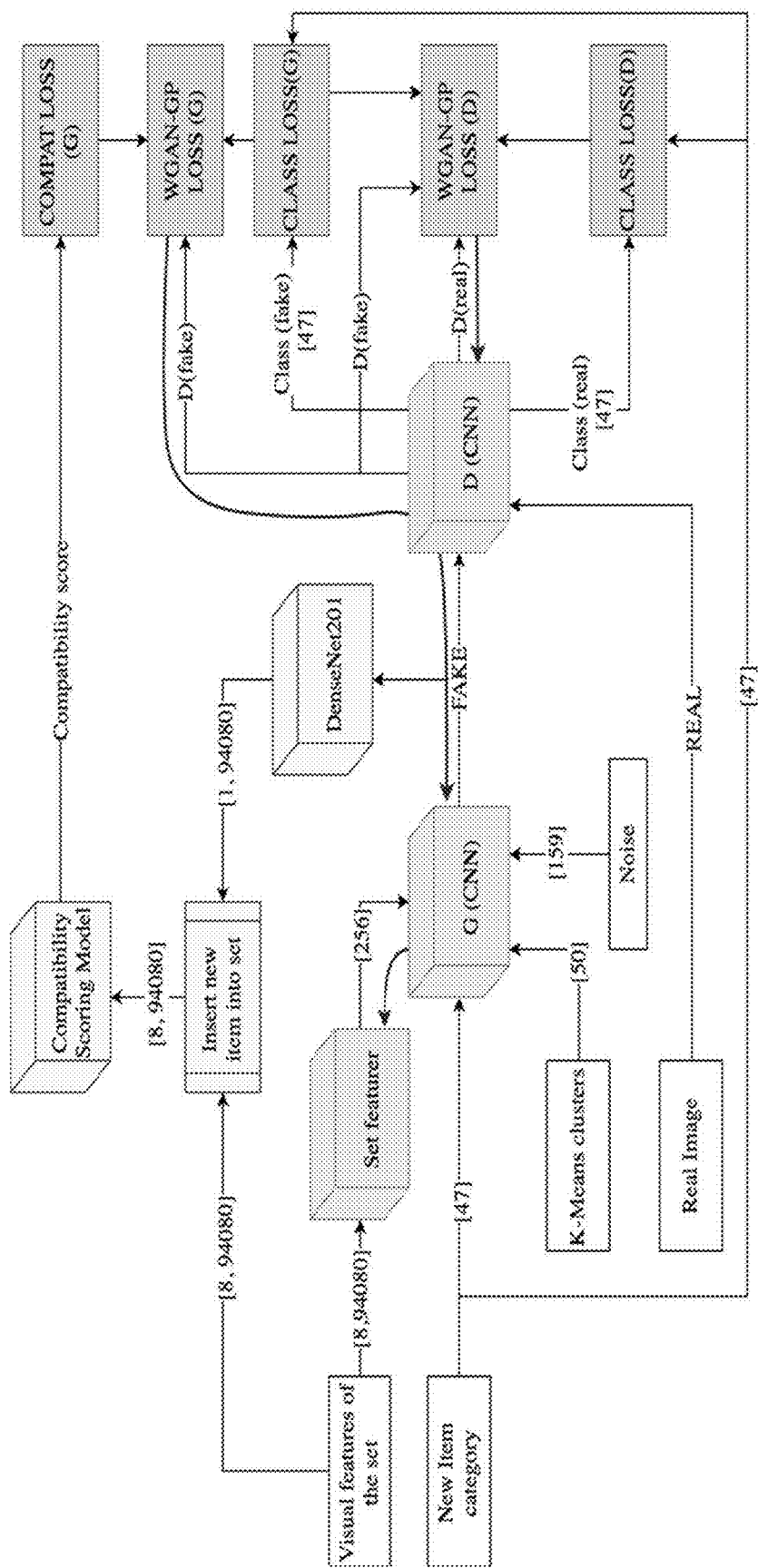
FIG. 5 is a diagram of non-limiting embodiments or aspects of a process for generating new items compatible with existing items.

For example, and referring also to FIGS. 4 and 5, training data may include a plurality of images (e.g., visual features of a set of images, etc.), random noise data associated with a random noise image, a representation of an item category (e.g., a category of a new item to be generated, etc.), and/or one or more real images (e.g., one or more non-fake or non-generated images including a real (non-generated or non-fake) item, etc.). As an example, generation system 102 may obtain training data including a plurality of images associated with a plurality of items $S_0 = \{x_1, x_2, x_3, \ldots x_n\}$ and random noise data associated with a random noise image z. In such an example, each image of the plurality of images may be associated with a single item of the plurality of items $S_0$ (e.g., shirt $x_1$, jacket $x_2$, shoes $x_3$, bag $x_4$, etc.).

In some non-limiting embodiments or aspects, an item category is associated with a type of item, such as a clothing item, a furniture item, a landscaping item, a graphical user interface item, an architectural item, an artwork item, and/or the like, and/or associated with a sub-type of a type of item, such as a type of clothing item (e.g., a shirt, a jacket, shoes, a bag, etc.), a type of furniture item (e.g., a chair, a table, a couch, a rug, etc.), a type of landscaping item (e.g., a tree, a bush, mulch, a statue, etc.), a graphical user interface item (e.g., a background, an icon, a task bar, a link, etc.) an artwork item (e.g., a painting, a picture, a vase, a statue, etc.), an architectural item (e.g., a building, a column, a window, a bridge, an arch, etc.) and/or the like. For example, a representation of an item category may include a one-hot encoded vector that shows the category of an item to be generated. As an example, a number of categories may vary depending on a type and/or sub-type of item to be generated, and the type and/or sub-type of the category of the item to be generated may be represented by the one-hot encoded vector.

In some non-limiting embodiments or aspects, an item of the plurality of items $S_0$ is replaced by a new item (e.g., a new item to be generated, etc.). For example, and still referring to FIG. 4, bag $x_4$ included in the plurality of items or outfit $S_0$ may be removed to generate or design a new bag that may be more suitable to the user and/or more compatible with the plurality of items or outfit $S_0$. As an example, if an item in the plurality of items $S_0$ is removed and replaced by a new generated item with the same item category as the removed item (e.g., replacing bag $x_4$ with a new bag, etc.), the new set of items may be represented as $S_1 = \{x_1, x_2, \ldots, x_{n-1}, x'\}$, in which $x'$ represents the new generated item.

In some non-limiting embodiments or aspects, a new item is added to the plurality of items $S_0$. For example, and still referring to FIG. 4, a new item (e.g., a necklace, etc.) may be generated or designed to be added to the plurality of items or outfit $S_0$, and the new item may be associated with an item category different than each item in the plurality of items. As an example, if a new item having an item category different than each item in the plurality of items or outfit $S_0$ is added to the plurality of items or outfit $S_0$, the new set of items may be represented as $S_1 = \{x_1, x_2, \ldots, x_{n-1}, x_n, x'\}$, in which $x'$ represents the new generated item. In such an example, a set of images may include a subset of images of the plurality of images, and the generated item may be associated with a same item category as an item of the plurality of items not included in a set of items associated with the set of images.

In some non-limiting embodiments or aspects, multiple item categories may be generated or designed for the plurality of items or outfit $S_0$. For example, multiple new items (e.g., a necklace, a ring, sunglasses, etc.) for addition to the plurality of items or outfit $S_0$ may be generated in addition to replacing an item (e.g., bag $x_4$), and the new set of items may be represented as $S_1 = \{x_1, x_2, \ldots, x_1', x_2', x_3' \ldots\}$, in which $x_i'$ is the new generated items. As an example, a set of images may include each image of the plurality of images, and the generated item may be associated with a different item category than each item of the plurality of items.

As shown in FIG. 3, at step 304, process 300 includes training an adversarial network including a series of generator networks and a series of discriminator networks. For example, generation system 102 may train an adversarial network including a series of generator networks and a series of discriminator networks. As an example, generation system 102 may train an adversarial network including a series of generator networks including a first generator network and at least one further generator network and a series of discriminator networks corresponding to the series of generator networks and including a first discriminator network and at least one further discriminator network.

For example, and referring again to FIGS. 4 and 5, generation system 102 may train an adversarial network (e.g., G (CNN) and D (CNN), etc.) including a series of generator networks (e.g., $G_1, G_2, G_3$, etc.) including a first generator network $G_1$ and at least one further generator network $G_2, G_3$, etc. and a series of discriminator networks (e.g., $D_1, D_2, D_3$, etc.) corresponding to the series of generator networks $G_1, G_2, G_3$, etc. and including a first discriminator network $D_1$ and at least one further discriminator network $D_2, D_3$, etc. As an example, training the adversarial network may include processing, with the first generator network $G_1$, a representation $\varphi_{s_1}$ of a set of images of the plurality of images and the random noise image (e.g., $S_1 = \{x_1, x_2, x_3, z\}$ and/or a representation of an item category C, to generate generated image data associated with a generated image $\tilde{x}_{G_i}$, the generated image $\tilde{x}_{G_i}$ being associated with a generated item $x_i'$ different than each item of the plurality of items $S_0$; processing, with the first discriminator network $D_1$, the generated image data and/or the representation of the item category C, to determine a prediction $L_{1\text{-}real/fake}$ of whether the generated item $x_i'$ is real and/or a prediction $L_{1\text{-}category}$ of whether the generated item is associated with the item category C; processing, with each respective further generator network of the at least one further generator network $G_2, G_3$, etc., a further representation $\varphi_{s2}, \varphi_{s3}$, etc. of the set of images of the plurality of images and the generated image data from a preceding generator network $G_{i-1}$ of the series of generator networks $G_1, G_2, G_3$, etc., to generate further generated image data associated with at least one further generated image $\varphi_{si}$, the at least one further generated image $\varphi_{si}$ being associated with the generated item $x_i'$ different than each item of the plurality of items $S_0$; processing, with each respective further discriminator network of the at least one further discriminator network $D_2, D_3$, etc., the further generated image data from a corresponding generator network $G_i$ of the series of generator networks $G_1, G_2, G_3$, etc. and/or the representation of the item category C, to determine at least one further prediction $L_{i\text{-}real/fake}$ of whether the generated item is real and/or at least one further prediction $L_{i\text{-}category}$ of whether the generated item is associated with the item category; and modifying, using a loss function of the adversarial network that depends on (i) a compatibility score $L_{1\text{-}comp}$ including a prediction of a compatibility of the set of images and the generated image, (ii) at least one further compatibility score $L_{i\text{-}comp}$ including a prediction of a compatibility of the set of images and the at least one further generated image, (iii) the prediction $L_{1\text{-}real/fake}$ and/or $L_{1\text{-}category}$, and (iv) the at least one further prediction $L_{i\text{-}real/fake}$ and/or $L_{i\text{-}category}$, one or more parameters of the series of generator networks $G_1, G_2, G_3$, etc.

In some non-limiting embodiments or aspects, training the adversarial network includes processing, with a first relation network $C_1$ of a series of relation networks $C_1, C_2, C_3$, etc. corresponding to the series of generator networks $G_1, G_2, G_3$, etc. and including the first relation network $C_1$ and at least one further relation network $C_2, C_3$, etc., the set of images of the plurality of images and the generated image data $S_2$ from the first generator network $G_1$ of the series of generator networks $G_1, G_2, G_3$, etc., to determine the compatibility score $L_{1\text{-}comp}$ including the prediction of the compatibility of the set of images and the generated image; and processing, with each respective further relation network of the at least one further relation network $C_2, C_3$, etc., the set of images of the plurality of images and the further generated image data $S_2, S_3$, etc. from a corresponding generator network $G_i$ of the series of generator networks $G_1, G_2, G_3$, etc., to determine the at least one further compatibility score $L_{i\text{-}comp}$ including the prediction of the compatibility of the set of images and the at least one further generated image. In some non-limiting embodiments or aspects, one or more relation networks of the series of relation networks $C_1, C_2, C_3$, etc. may include a compatibility network or model as disclosed by U.S. Provisional Patent Application No. 62/725,454, filed on Aug. 31, 2018, and assigned to the Assignee of the present disclosure, the entire contents of which is hereby incorporated by reference in its entirety.

In some non-limiting embodiments or aspects, training the adversarial network includes processing, with the first relation network $C_1$ of the series of relation networks, the set of images and the generated image, to determine a feature vector representation $\varphi_{s1}$ of the set of images and the generated image; processing, with each respective further relation network of the at least one further relation network $C_2, C_3$, etc., the set of images and the at least one further generated image, to determine at least one further feature vector representation $\varphi_{si}$ of the set of images and the at least one further generated image; processing, with another relation network CA, the plurality of images, to determine another feature vector representation of the plurality of images; determining a first divergence $L_{1\text{-}Div}$ (or $L_{1\text{-}KL}$) between the feature vector representation and the another feature vector representation; determining at least one further divergence $L_{2\text{-}Div}$, $L_{3\text{-}Div}$ (or $L_{2\text{-}KL}$, $L_{3\text{-}KL}$, etc.), etc. between each further feature vector representation of the at least one further feature vector representation and the another feature vector representation, wherein the loss function of the adversarial network further depends on the divergence and the at least one further divergence. In some non-limiting embodiments or aspects, the another relation network CA may include a compatibility network or model as disclosed by U.S. Provisional Patent Application No. 62/725,454, filed on Aug. 31, 2018, and assigned to the Assignee of the present disclosure, the entire contents of which is hereby incorporated by reference in its entirety. For example, $L_{i\text{-}Div}$ (or $L_{i\text{-}KL}$) may include an indication or a prediction of whether a new seat feature (e.g., including the generated image, etc.) has a similar distribution to an original set feature (e.g., including a real image, etc.).

In some-non-limiting embodiments or aspects, training the adversarial network includes processing, with an initial relation network $C_I$, the set of images and the random noise image, to determine the representation of the set of images of the plurality of images and the random noise image as an initial feature vector representation $\varphi_{s1}$ of the set of images and the random noise image (e.g., $S_1$). In some non-limiting embodiments or aspects, the initial relation network $C_I$ may include a compatibility network or model as disclosed by U.S. Provisional Patent Application No. 62/725,454, filed on Aug. 31, 2018, and assigned to the Assignee of the present disclosure, the entire contents of which is hereby incorporated by reference in its entirety.

In some non-limiting embodiments or aspects, and still referring to FIGS. 4 and 5, for each new item to be generated, a noise vector may be created as a placeholder for the new item to be created. For example, the series of generator networks $G_1$, $G_2$, $G_3$, etc. may convert the noise vector to a plausible image that has a consistent style (e.g., fashion style, etc.) with the items in the new set of items $S_1$. As an example, if removing bag $x_4$ from the plurality of items or outfit $S_0$ shown in FIG. 4 to generate or create a new bag that is compatible with the items in the new set of items or outfit $S_1$, a random noise image with a chosen distribution (e.g., Gaussian distribution N(0, I), etc.) may be generated and added to the new set of items or outfit $S_1$. In such an example, the random noise image may have the same dimension of the other images in the dataset. For example, the new set of items may be represented as $S_1 = \{x_1, x_2, \ldots, x_{n-1}, z\}$.

In some non-limiting embodiments or aspects, $S_1$ may be input to a first compatibility network or model $C_1$ as described herein and shown by implementations 400 and 500 in FIGS. 4 and 5, which may be a classifier that receives images of any number of items and determines a compatibility score (e.g., a prediction of a compatibly of the items, etc.) between 0 and 1. For example, a last layer of the compatibility network or model $C_1$ before a classification layer of the compatibility network or model $C_1$ may include a feature extraction layer. As an example, the feature extraction layer may output a feature vector or item set embedding $\varphi_s$ that represents the entire set of items $S_1 = \{x_1, x_2, \ldots, x_{n-1}, z\}$ and fashion related characteristics of the set of items $S_1 = \{x_1, x_2, \ldots, x_{n-1}, z\}$. In such an example, the classification layer (e.g., the last layer of the compatibility network or model, etc.) may be output or return a prediction (e.g., a compatibility score between 0 and 1, etc.), which represents a compatibility of the new set of items $S_1$. For example, the compatibility score for a plurality of items or outfit S may be represented as $m_s$. As an example, a compatibility network or model $C_i$ may output or return an outfit feature vector $\varphi_s$ and a compatibly score $m_s$, such that $\varphi_{s_0} = C_\varphi(S_0)$ and $\varphi_{s_1} = C_\varphi(S_1)$. For example, an original set of items may be represented according to the following Equations (2) and (3):

$$S_0 = \{x_1, x_2, \ldots, x_{n-1}, x_n\} \qquad (2)$$

$$\varphi_{s_0} = C_\varphi(S_0) \qquad (3)$$

If an item is replaced with random noise z, a modified set of items $S_1$ may be represented according to the following Equations (4), (5), and (6):

$$S_1 = \{x_1, x_2, \ldots, x_{n-1}, z\} \qquad (4)$$

$$\varphi_{s_1} = C_\varphi(S_1) \qquad (5)$$

$$\hat{x}_{G_1} = G_1(\varphi_{s_1}, c) \qquad (6)$$

Accordingly, for each generator network $G_i$, an input thereto may be represented according to the following Equations (7) through (12):

$$\hat{x}_{G_i} = G_i(\varphi_{s_i}, c), i = 2, \ldots, m \qquad (7)$$

$$\varphi_{s_i} = C_\varphi(S_i) \qquad (8)$$

$$S_i = \{x_1, x_2, \ldots, x_{n-1}, \hat{x}_{G_{i-1}}\}, \qquad (9)$$

$$\tilde{x}_{G_i} = G_i(\varphi_{s_i}, c) \qquad (10)$$

$$\tilde{x}_{G_i} = G_i(C(S_i), c) \qquad (11)$$

$$S_i = \{x_1, x_2, \ldots, x_{n-1}, G_{i-1}(C(S_{i-1}), c)\} \qquad (12)$$

For example, each generator ($G_i$) may receive an output feature vector $\varphi_{s_i}$ and a one-hot encoded vector that indicates or represents a category of an item to be generated by the series of generator networks $G_1$, $G_2$, $G_3$, etc. An output of a generator ($G_i$) may be an image that may represented as $\tilde{x}_{G_i}$. For example, an output of a generator ($G_i$) may be represented according to the following Equation (13):

$$\tilde{x}_{G_i} = G_i(\varphi_{s_i}, c) \qquad (13)$$

which may be rewritten according to the following Equation (14):

$$\tilde{x}_{G_i} = G_i(C_\varphi(S_i), c) \qquad (14)$$

where $S_i$ is represented according to the following Equation (15):

$$S_i = \{x_1, x_2, \ldots, x_{n-1}, \ldots, G_{i-1}(C(S_{i-1}), c)\} \qquad (15)$$

Progressive GANs, such as those disclosed by Karras, Tero, et al., in the paper titled "Progressive growing of GANs for improved quality, stability, and variation", arXiv preprint arXiv:1710.10196 (2017); Stack GANs, such as those disclosed by Zhang, Han, et al. in the paper titled "Stackgan++: Realistic image synthesis with stacked generative adversarial networks", arXiv preprint arXiv: 1710.10916 (2017) and Zhang, Han, et al. "Stackgan: Text to photo-realistic image synthesis with stacked generative adversarial networks", Proceedings of the IEEE International Conference on Computer Vision. 2017; and Laplacian GANs, such as those disclosed by Denton, Emily L., Soumith Chintala, and Rob Fergus in the paper titled "Deep generative image models using a Laplacian pyramid of adversarial networks", Advances in neural information processing systems, 2015, the entire contents of each of which are hereby incorporated by reference in their entirety, each attempt to break down the challenging problem of trying to generate a high-resolution image in one shot into multiple stages. For example, in these existing systems, there are multiple generators and discriminators, and each generator uses an output of a previous generator to create a higher resolution image (e.g., the first generator creates 4×4 pixel images, the second generator creates 8×8 pixel images, etc.).

Non-limiting embodiments or aspects of the present disclosure learn a joint distribution made from multiple images instead of attempting to generate a single image by learning a single distribution. For example, instead of passing $\tilde{x}_{G_i}$ (e.g., an image generated by generator ($G_i$) as input to a next generator $G_{i+1}$, $\tilde{x}_{G_i}$ is combined with the rest of the items (e.g., the other items, etc.) in the plurality of items or outfit and considered as new set or outfit $S_{i+1}$. As an example, a feature vector of this new set of items or outfit, which includes the generated image from a previous generator ($G_i$) (or the initial random noise vector representation) is input to the successive generator ($G_{i+1}$) with the one-hot-encoded item category vector. In such an example, instead of feeding a simple noise vector to the generator network G (CNN) (e.g., to a first generator network ($G_1$) of the series of generator networks), a feature vector that comes from the output of a compatibility network or module C may be input to the first generator network ($G_1$) and, therefore, in addition to having some randomness because of the random noise image being embedded in the outfit, the feature vector can capture fashion style that exists in the outfit. In some non-limiting embodiments or aspects, a compatibility network or model C may be pre-trained (e.g., as described in U.S. Provisional Patent Application No. 62/725,454, filed on Aug. 31, 2018, and assigned to the Assignee of the present disclosure, the entire contents of which is hereby incorporated by reference in its entirety), or a compatibility network or model C can be trained with the remainder of the network (e.g., concurrently with the adversarial network including generator G (CNN) and discriminator D (CNN), etc.).

A loss or objective function for the adversarial network including the generator network G (CNN) (e.g., the series of generator networks) and the discriminator network D (CNN) (e.g., the series of discriminator networks) may be defined to train the adversarial network and backpropagation through the adversarial network. Generative models, such as that introduced by Goodfellow, Ian, et al. "Generative adversarial nets." Advances in neural information processing systems, 2014, the entire contents of which is hereby incorporated in its entirety by reference, use a min-max game in which one player (e.g., a generator) attempts to create an image that appears realistic to fool the other player (e.g., a discriminator). For example, a discriminator may be a classifier that tries to catch the fake images generated by the generator and distinguish the fake images from real images. As an example, the game (e.g., training, etc.) may end when the generator and discriminator reach an equilibrium. In such an example, to train an adversarial network the discriminator and generator may be alternatively optimized (e.g., back propagated). In an application or testing mode of GANs, the discriminator is not needed anymore (e.g., only a noise vector may be passed to the generator and a realistic looking image may be provided as the output of the generator, etc.).

A loss or objective function of an adversarial network according to non-limiting embodiments or aspects may include a generator loss or objective function and a discriminator loss or objective function. For example, an overall loss for generation (e.g., for a series of generator networks, etc.) is a sum of the losses of each of the generator networks in the series of generator networks. As an example, an overall loss for discrimination (e.g., for a series of discriminator networks, etc.) is a sum of the losses of each of the discriminator networks in the series of discriminator networks.

In some non-limiting embodiments or aspects, an overall loss for a series of generators $L_G$ is a sum of the losses of each generator $L_{G_i}$ in the series of generators, which may be represented according to the following Equation (16):

$$L_G = \sum_{i=1}^{i=n} L_{G_i} \tag{16}$$

in which $L_{G_i}$ is represented according to the following Equation (17):

$$L_{G_i} = \alpha L_{real/fake} + \beta L_{cat} + \lambda_i L_{comp} + \omega L_{KL} \tag{17}$$

where $\alpha$, $\beta$, $\lambda_i$, and $\omega$ are scaling parameters.

For example, each term used to represent the loss of a generator $L_{G_i}$ may have a scaling parameter ($\alpha$, $\beta$, $\lambda_i$, $\omega$). These scaling parameters ($\alpha$, $\beta$, $\lambda_i$, $\omega$) serve at least the following purposes: the scaling parameters ($\alpha$, $\beta$, $\lambda_i$, $\omega$) ensure that each of the terms that define the loss of the generator are in the same range so that one single term does not overpower the overall or aggregated loss (e.g., the range of each the terms may be between 0 and 1, etc.); and the scaling parameters ($\alpha$, $\beta$, $\lambda_i$, $\omega$) decide how much each term that defines the loss of the generator should contribute to the overall loss or objective function. The scaling parameters may be constant numbers or dynamic numbers that vary in training. For compatibility loss, $\lambda_i$ (e.g., a hyper parameter that controls the contribution of compatibility loss to the overall loss, etc.) may be considered as linearly increasing as successive generators (e.g., larger than i, etc.) are used, because the initial generator ($G_1$) may learn to draw higher level features such as rough shapes and colors of objects and, as later or successive generators in the series of generators are applied, these later or successive generators may draw more fine-grained and lower level features. For example, finer-grained details and lower-level features may have a more significant impact on a compatibility between items. For example, at a first generator ($G_1$) compatibility may be less significant and/or less effected; however, compatibility may become more significant and/or more effected as later or successive generators generate higher resolution images. As an example, $\lambda_i$ may be linearly increased. In such an example, if there are three generator networks, each $\lambda_i$ may be as follows $$\lambda_1 = \frac{1}{6}, \lambda_2 = \frac{2}{6}, \lambda_3 = \frac{3}{6}$$

such that $\lambda_1+\lambda_2+\lambda_3=1$. In such an example, for n generators, the scaling parameter $\lambda_i$ may be represented according to the following Equation (18):

$$\sum_i \lambda_i = 1, \lambda_i = \frac{2i}{n(n+1)} \tag{18}$$

For a generated image to look realistic, a loss term is set such that the loss term is zero if the generated image is more realistic and the loss term is one if the generated image is less realistic. A first job of a discriminator is to classify if an image is real or fake (e.g., generated) and, therefore, the discriminator may return a score between 0 and 1, such that if the discriminator returns 1 it indicates that the image looks realistic and the generator is not punished, and if the discriminator returns 0 it indicates that the generated image looks unrealistic and the generator is punished. For example, a term of the loss function representative of whether a generated image is real or fake may be represented according to the following Equation (19):

$$L_{real/fake} = -\log D_i(G_i(\varphi_{s_{i-1}}, c)) \qquad (19)$$

For a generated image to have a correct category, a loss term is set such that the loss term is zero if the discriminator network (e.g., a multi-purpose classifier, etc.) determines that the generated image has the correct category and the loss term is a larger number (e.g., 1, etc.) if the discriminator network determines that the generated image is an incorrect category. For example, if a hand bag is intended to be generated (e.g., the one-hot encoded category represents a hand bag), but a generator instead generates an image including an item that appears more similar to an item of a different item category, e.g., a backpack, etc., the generator is considered to have performed poor and, thus, is associated with a higher loss. However, if the generated image includes an item that appears to be a hand-bag, the generator is considered to have performed well and, thus, is associated with a lower loss for this term. The discriminator is thus a multi-purpose classifier that classifies real/fake images and classifies the category of the generated image (e.g., the classifier determines if an image is real or fake and determines the category of the image, etc.). For example, a term of the loss function (e.g., a mult-class cross entropy loss function, etc.) representative of whether a generated image is an image of an item of a correct category or an incorrect category may be represented according to the following Equation (20):

$$L_{cat} = \sum_{c=1}^{M} -y_c \log(p_c) \qquad (20)$$

where M is a number of classes (e.g., categories, such as shirt, pants, shoes, and/or the like, etc.), $y_c$ is 1 if c is the intended category (e.g. the category indicated by the representation of the item category, etc.) and otherwise 0, and $p_c$ is a predicted probability of the class or category c.

As described herein, in some non-limiting embodiments or aspects, a compatibility network or model, such as that disclosed by U.S. Provisional Patent Application No. 62/725,454, filed on Aug. 31, 2018, and assigned to the Assignee of the present disclosure, the entire contents of which is hereby incorporated by reference in its entirety, may be used to ensure that an item of a generated image is compatible with a plurality of other items or an outfit. For example, after each generator G, the generated image Gi output from that generator may be combined with the other items in the plurality of items or the outfit and passed or input as a new plurality of items or outfit to the compatibility network or model. The compatibility network or model may process the new outfit to generate a compatibility score $m_s$ and a feature vector $\varphi$. If $m_s$ is relatively close to one (e.g. within a threshold distance, etc.), the item of the generated image is considered to be compatible with the other items in the plurality of images or outfit and, therefore, a loss of compatibility for the generator may be relatively close to zero. If $m_s$ is relatively close to 0 (e.g., within a threshold distance, etc.), the item of the generated image is considered to be not compatible with the other items in the plurality of images or outfit and, therefore, the loss of compatibility for the generator may be relatively higher. Accordingly, the compatibility loss of the generator may be represented according to the following Equations (21) through (23):

$$L_{comp} = 1 - m_s \qquad (21)$$

$$m_S = f_{\theta_f}\left(\frac{1}{\binom{n}{2}} \sum_{i,j} g_{\theta_g}(v_i, v_j)\right) \qquad (22)$$

$$L_{comp} = 1 - f_{\theta_f}\left(\frac{1}{\binom{n}{2}} \sum_{i,j} g_{\theta_g}(v_i, v_j)\right) \qquad (23)$$

In some non-limiting embodiments or aspects, for a new plurality of items or a new outfit that includes the generated item to have a similar fashion style and distribution to an original or input plurality of item or outfit, a regularization term may be added to the generator loss function. For example, the Kullback-Leibler divergence may be added to the loss function to enforce the feature vector ($\varphi$) of the final outfit including the generated item to be close to the feature vector of the initial outfit that we began with (with no generated item). As an example, the Kullback-Leibler divergence may be represented according to the following Equation (24):

$$L_{KL} = \varphi_S(x_1, x_2, \ldots, x_n) \| \varphi_{s_i}(x_1, x_2, \ldots, G_i(\varphi_{s_{i-1}}, c)) \qquad (24)$$

where $(x_1, x_2, \ldots, x_n)$ is a set of item or an outfit with a real image and $(x_1, x_2, \ldots, G_i(\varphi_{s_{i-1}}, c))$ is a set of items or an outfit with a generated image.

Accordingly, the loss of each generator $L_G$, in the series of generators may be represented according to the following Equation (25):

$$L_{G_i} = E_{z \sim p_z, S \sim p_{data}}[-\log D_i(G_i(\varphi_{s_{i-1}}, c))] + \qquad (25)$$
$$\sum_{c=1}^{M} -y_{o,c} \log(p_{o,c}) + \lambda_i \left(1 - f_{\theta_f}\left(\frac{1}{\binom{n}{2}} \sum_{i,j} g_{\theta_g}(v_i, v_j)\right)\right) +$$
$$\varphi_s(x_1, x_2, \ldots, x_n) \| \varphi_{s_i}(x_1, x_2, \ldots, x_{n-1}, G_i(\varphi_{s_{i-1}}, c))$$

In some non-limiting embodiments or aspects, an overall loss $L_D$ for a series of discriminators is a sum of the losses of each generator $L_{D_i}$ in the series of generators, which may be represented according to the following Equation (26):

$$L_D = \sum_{i=1}^{i=n} L_{D_i} \qquad (26)$$

in which $L_{D_i}$ may be represented according to the following Equations (27) and (28):

$$L_{D_i} = \alpha L_{real/fake} + \beta L_{cat} \qquad (27)$$

$$L_{D_i} = -\log D_i(x_i, c) - \log(1 - D(G_i(\varphi_{s_i}, c), c)) + \sum_{c=1}^{M} -y_c \log(p_c) \qquad (28)$$

where $L_{real/fake}$ is a term of the loss function representative of whether a generated image is real or fake, $L_{cat}$ is a term of the loss function (e.g., a mult-class cross entropy loss function, etc.) representative of whether a generated image is an image of an item of a correct category or an incorrect category, and $\alpha$ and $\beta$ are scaling parameters as described herein.

In each step of a training process, a discriminator may process a batch of real images and a batch of fake images and attempt to classify each image as a real image or a fake image. For example, real images may be obtained from a same or similar dataset as described in U.S. Provisional Patent Application No. 62/725,454, filed on Aug. 31, 2018, and assigned to the Assignee of the present disclosure, the entire contents of which is hereby incorporated by reference in its entirety, and fake images may be images generated by the generator network. For example, a term of the loss function associated with whether a generated image is a real image or a fake image may be represented according to the following Equation (29):

$$L_{real/fake} = -\log D_i(x_1,c) - \log(1 - D(G_i(\varphi_{s_i}c),c)) \qquad (29)$$

where $x_i$ is a real image with category C from a real dataset (e.g., a real bag) and $G_i(\varphi_{s_i},c)$ is a fake image that comes from the generator $G_i$. If discriminator predicts label 1 for a real image ($x_i$), the discriminator has correctly identified this image as a real image and therefore log 1=0 and no loss is added to the discriminator. If discriminator predicts label 0 for a real image ($x_i$), the discriminator has made a mistake and −log 0 is a very large number, which results in added loss of the discriminator. For a fake image $\tilde{x}_{G_i} = G_i(\varphi_{s_i},c)$ if the discriminator predicts 0, no loss is added to the discriminator, but if the discriminator mistakenly predicts 1 for the fake image, a relatively large number is added to the loss of the discriminator.

The discriminator, when determining the category of a generated image, also learns how to classify the category of clothing items. For example, the discriminator performs a multi-class classification task and, therefore, similar to the generator, a multi-class cross entropy loss whether the item category is correct may be represented according to the following Equation (30):

$$L_{cat} = \sum_{c=1}^{M} -y_c \log(p_c) \qquad (30)$$

where $y_c$ is 1 if c is the intended category (e.g. the category indicated by the representation of the item category, etc.) and otherwise 0, and $p_c$ is a predicted probability of the class or category c.

To train an adversarial network as described herein, a dataset crawled from Polyvore, for example, as described in U.S. Provisional Patent Application No. 62/725,454, filed on Aug. 31, 2018, and assigned to the Assignee of the present disclosure, the entire contents of which is hereby incorporated by reference in its entirety, may be used. In this dataset, each set of items (e.g., outfit, etc.) may include two or more items. For each outfit set in the dataset, multiple training outfits may be created by randomly removing one of the items in the outfit. For example, if one of the original outfits is $S=\{x_1,x_2,x_3\}$, the following three outfits may be created from the original outfit and used to train an adversarial network as described herein: $S_1=\{x_1,x_2\}$; $S_2=\{x_1,x_3\}$; and $S_3=\{x_2,x_3\}$. For example, in each outfit the category of item that has been removed may be the category of item generated.

In some non-limiting embodiments or aspects, rather than creating a completely new item or items, an already existing item or items in an outfit in a set of items or an outfit may be altered to suggest to a consumer or a user how an item or items may be "tailored" to make the outfit more compatible. For example, an output of the first generator network ($G_1$) may be represented according to the following Equation (31) in order to alter an already existing item in the set of items $S_0$:

$$= \min_{z' \in R^{32}} \|G(\varphi_{s_i}, c) - x_i\|_1 \qquad (31)$$

In some non-limiting embodiments or aspects, an adversarial network may be trained with mini-batch gradient descent by alternatively optimizing the discriminator and generator. In some non-limiting embodiments or aspects, because generated images may be more plausible if the discriminator is better optimized, the discriminator may be trained or optimized multiple times before training the generator at each iterative step.

Although non-limiting embodiments or aspects of the present disclosure are described herein primarily with respect to an adversarial network including three generators (G) and three discriminators (D) (e.g., the three generators are shown as creating 32×32 pixel, 64×64 pixel, and 128×128 pixel images with respect to FIG. 4), non-limiting embodiments or aspects of the present disclosure are not limited thereto and an adversarial network may include any number of generators and discriminators that create images of any desired resolution.

As shown in FIG. 3, at step 306, process 300 includes providing a series of generator networks from a trained adversarial network. For example, generation system 102 may provide a series of generator networks from a trained adversarial network. As an example, generation system 102 may provide the series of generator networks from the trained adversarial network. In such an example, the series of generator networks may include one or more parameters that have been modified based on a loss function of the adversarial network.

As shown in FIG. 3, at step 308, process 300 includes obtaining input data and random noise data. For example, generation system 102 may obtain input data and random noise data. As an example, generation system 102 may obtain input data associated with a plurality of images (e.g., a further plurality of images, etc.) and random noise data associated with a random noise image (e.g., further random noise data associated with a further random noise image, etc.).

As shown in FIG. 3, at step 310, process 300 includes processing input data and random noise data using a series of generator networks to generate output data. For example, generation system 102 may process input data and random noise data using a series of generator networks to generate output data. As an example, generation system 102 may process the input data and the further random noise data using the series of generator networks from the trained adversarial network, to generate output data. In such an example, the output data may include an image of an item different than the items included in the further plurality of images. For example, the further plurality of images may include images of clothing items, and the output data may include an image of a clothing item different than the clothing items included in the further plurality of images.

In some non-limiting embodiments or aspects, processing input data and random noise data using a series of generator networks (e.g., $G_1$, $G_2$, $G_3$, etc.) to generate output data may include processing, with an initial relation network $C_I$, a set of images of the plurality of images and the random noise image (e.g., $S_1$, etc.), to determine an initial feature vector representation $\varphi_{s_1}$ of the set of images and the random noise image; processing, with a first generator network $G_1$ of a series of generator networks including the first generator network and at least one further generator network, the initial feature vector representation $\varphi_{s_1}$, to generate image data associated with a generated image, the generated image being associated with a generated item different than each item of the plurality of items; processing, with each respective relation network $C_i$ of a series of relation networks $C_1$, $C_2$, $C_3$, etc. corresponding to the series of generator networks $G_1$, $G_2$, $G_3$, etc., the set of images of the plurality of images and the generated image data from a corresponding generator network of the series of generator networks, to determine a further feature vector representation $\varphi_{s_i}$ of the set of images and the generated image; and processing, with each respective generator network of the at least one further generator network $G_2$, $G_3$, etc., the further feature vector representation from a preceding relation network of the series of relation networks, to generate further image data associated with at least one further generated image, wherein the at least one further generated image is associated with the generated item different than each item of the plurality of items.

In some non-limiting embodiments or aspects, processing input data and random noise data using a series of generator networks to generate output data may include processing, with the first generator network of the series of generator networks, the initial feature vector representation and a vector representation of an item category, to generate the image data associated with the generated image; and processing, with each respective generator network of the at least one further generator network, the further feature vector representation from the preceding relation network of the series of relation networks and the representation of the item category, to generate the further image data associated with the at least one further generated image.

Although embodiments or aspects have been described in detail for the purpose of illustration and description, it is to be understood that such detail is solely for that purpose and that embodiments or aspects are not limited to the disclosed embodiments or aspects, but, on the contrary, are intended to cover modifications and equivalent arrangements that are within the spirit and scope of the appended claims. For example, it is to be understood that the present disclosure contemplates that, to the extent possible, one or more features of any embodiment or aspect can be combined with one or more features of any other embodiment or aspect. In fact, any of these features can be combined in ways not specifically recited in the claims and/or disclosed in the specification. Although each dependent claim listed below may directly depend on only one claim, the disclosure of possible implementations includes each dependent claim in combination with every other claim in the claim set.

What is claimed is:

1. A computer-implemented method comprising:
   obtaining, with at least one processor, training data associated with a plurality of images and existing image data associated with an existing image associated with an existing item, wherein each image of the plurality of images is associated with a single item of a plurality of items;
   training, with at least one processor, an adversarial network including a series of generator networks including a first generator network and at least one further generator network and a series of discriminator networks corresponding to the series of generator networks and including a first discriminator network and at least one further discriminator network by:
     processing, with a first generator network of the series of generator networks, a representation of a set of images of the plurality of images and the existing image, to generate generated image data associated with a generated image, wherein the generated image is associated with a generated item associated with the existing item;
     processing, with a first discriminator network of the series of discriminator networks, the generated image data, to determine a prediction of whether the generated item is real;
     processing, with each respective further generator network of the at least one further generator network, a further representation of the set of images of the plurality of images and the generated image data from a preceding generator network of the series of generator networks, to generate further generated image data associated with at least one further generated image, wherein the at least one further generated image is associated with the generated item associated with the existing item;
     processing, with each respective further discriminator network of the at least one further discriminator network, the further generated image data from a corresponding generator network of the series of generator networks, to determine at least one further prediction of whether the generated item is real; and
     modifying, using a loss function of the adversarial network that depends on (i) a compatibility score including a prediction of a compatibility of the set of images and the generated image, (ii) at least one further compatibility score including a prediction of a compatibility of the set of images and the at least one further generated image, (iii) the prediction, and (iv) the at least one further prediction, one or more parameters of the series of generator networks.

2. The computer-implemented method of claim 1, wherein training the adversarial network includes:
   processing, with the first generator network of the series of generator networks, (a) the representation of the set of images of the plurality of images and the existing image and (b) a representation of an item category, to generate the generated image data associated with the generated image;
   processing, with the first discriminator network of the series of discriminator networks, the generated image data and the representation of the item category, to determine the prediction, wherein the prediction includes predictions of (i) whether the generated item is real and (ii) whether the generated item is associated with the item category;

processing, with each respective further generator network of the at least one further generator network, (a) the at least one further representation of the set of images of the plurality of images and the generated image data from the preceding generator network of the series of generator networks and (b) the representation of the item category, to generate the further generated image data associated with the at least one further generated image; and processing, with each respective further discriminator network of the at least one further discriminator network, the generated image data from the corresponding generator network of the series of generator networks and the representation of the item category, to determine the at least one further prediction, wherein the at least one further prediction includes predictions of (i) whether the generated item is real and (ii) whether the generated item is associated with the item category.

3. The computer-implemented method of claim 2, wherein the generated item is associated with a same item category as the existing item.

4. The computer-implemented method of claim 1, wherein training the adversarial network includes:
processing, with a first relation network of a series of relation networks corresponding to the series of generator networks and including the first relation network and at least one further relation network, the set of images of the plurality of images and the generated image data from the first generator network of the series of generator networks, to determine the compatibility score including the prediction of the compatibility of the set of images and the generated image; and
processing, with each respective further relation network of the at least one further relation network, the set of images of the plurality of images and the further generated image data from a corresponding generator network of the series of generator networks, to determine the at least one further compatibility score including the prediction of the compatibility of the set of images and the at least one further generated image.

5. The computer-implemented method of claim 1, wherein training the adversarial network includes:
processing, with a first relation network of a series of relation networks, the set of images and the generated image, to determine a feature vector representation of the set of images and the generated image;
processing, with each respective further relation network of the at least one further relation network, the set of images and the at least one further generated image, to determine at least one further feature vector representation of the set of images and the at least one further generated image;
processing, with another relation network, the plurality of images, to determine another feature vector representation of the plurality of images;
determining a first divergence between the feature vector representation and the another feature vector representation; and
determining at least one further divergence between each further feature vector representation of the at least one further feature vector representation and the another feature vector representation,
wherein the loss function of the adversarial network further depends on the divergence and the at least one further divergence.

6. The computer-implemented method of claim 1, wherein training the adversarial network includes:
processing, with an initial relation network, the set of images and the existing image, to determine the representation of (a) the set of images of the plurality of images and (b) the existing image as an initial feature vector representation of the set of images and the existing image.

7. The computer-implemented method of claim 1, further comprising:
providing, with at least one processor, the series of generator networks including the one or more parameters that have been modified based on the loss function of the adversarial network;
obtaining, with at least one processor, input data associated with a further plurality of images and further existing image data associated with a further existing image; and
processing, with at least one processor using the series of generator networks, the input data and the further existing image data to generate output data.

8. A computer-implemented method comprising:
obtaining, with at least one processor, input data associated with a plurality of images and existing image data associated with an existing image associated with an existing item, wherein each image of the plurality of images is associated with a single item of a plurality of items;
processing, with an initial relation network, a set of images of the plurality of images and the existing image, to determine an initial feature vector representation of the set of images and the existing image;
processing, with a first generator network of a series of generator networks including the first generator network and at least one further generator network, the initial feature vector representation, to generate image data associated with a generated image, wherein the generated image is associated with a generated item associated with the existing item;
processing, with each respective relation network of a series of relation networks corresponding to the series of generator networks, the set of images of the plurality of images and the generated image data from a corresponding generator network of the series of generator networks, to determine a further feature vector representation of the set of images and the generated image; and
processing, with each respective generator network of the at least one further generator network, the further feature vector representation from a preceding relation network of the series of relation networks, to generate further image data associated with at least one further generated image, wherein the at least one further generated image is associated with the generated item associated with the existing item.

9. The computer-implemented method of claim 8, further comprising:
processing, with the first generator network of the series of generator networks, the initial feature vector representation and a vector representation of an item category, to generate the image data associated with the generated image; and
processing, with each respective generator network of the at least one further generator network, the further feature vector representation from the preceding relation network of the series of relation networks and the representation of the item category, to generate the further image data associated with the at least one further generated image.

10. A computing system comprising:
one or more processors programmed and/or configured to:
obtain training data associated with a plurality of images and existing image data associated with an existing image associated with an existing item, wherein each image of the plurality of images is associated with a single item of a plurality of items;
train an adversarial network including a series of generator networks including a first generator network and at least one further generator network and a series of discriminator networks corresponding to the series of generator networks and including a first discriminator network and at least one further discriminator network by:
processing, with a first generator network of the series of generator networks, a representation of a set of images of the plurality of images and the existing image, to generate generated image data associated with a generated image, wherein the generated image is associated with a generated item associated with the existing item;
processing, with a first discriminator network of the series of discriminator networks, the generated image data, to determine a prediction of whether the generated item is real;
processing, with each respective further generator network of the at least one further generator network, a further representation of the set of images of the plurality of images and the generated image data from a preceding generator network of the series of generator networks, to generate further generated image data associated with at least one further generated image, wherein the at least one further generated image is associated with the generated item associated with the existing item;
processing, with each respective further discriminator network of the at least one further discriminator network, the further generated image data from a corresponding generator network of the series of generator networks, to determine at least one further prediction of whether the generated item is real; and
modifying, using a loss function of the adversarial network that depends on (i) a compatibility score including a prediction of a compatibility of the set of images and the generated image, (ii) at least one further compatibility score including a prediction of a compatibility of the set of images and the at least one further generated image, (iii) the prediction, and (iv) the at least one further prediction, one or more parameters of the series of generator networks.

11. The system of claim 10, wherein training the adversarial network includes:
processing, with the first generator network of the series of generator networks, (a) the representation of the set of images of the plurality of images and the existing image and (b) a representation of an item category, to generate the generated image data associated with the generated image;
processing, with the first discriminator network of the series of discriminator networks, the generated image data and the representation of the item category, to determine the prediction, wherein the prediction includes predictions of (i) whether the generated item is real and (ii) whether the generated item is associated with the item category;
processing, with each respective further generator network of the at least one further generator network, (a) the at least one further representation of the set of images of the plurality of images and the generated image data from the preceding generator network of the series of generator networks and (b) the representation of the item category, to generate the further generated image data associated with the at least one further generated image; and
processing, with each respective further discriminator network of the at least one further discriminator network, the generated image data from the corresponding generator network of the series of generator networks and the representation of the item category, to determine the at least one further prediction, wherein the at least one further prediction includes predictions of (i) whether the generated item is real and (ii) whether the generated item is associated with the item category.

12. The system of claim 11, wherein the generated item is associated with a same item category as the existing item.

13. The system of claim 10, wherein training the adversarial network includes:
processing, with a first relation network of a series of relation networks corresponding to the series of generator networks and including the first relation network and at least one further relation network, the set of images of the plurality of images and the generated image data from the first generator network of the series of generator networks, to determine the compatibility score including the prediction of the compatibility of the set of images and the generated image; and
processing, with each respective further relation network of the at least one further relation network, the set of images of the plurality of images and the further generated image data from a corresponding generator network of the series of generator networks, to determine the at least one further compatibility score including the prediction of the compatibility of the set of images and the at least one further generated image.

14. The system of claim 10, wherein training the adversarial network includes:
processing, with a first relation network of a series of relation networks, the set of images and the generated image, to determine a feature vector representation of the set of images and the generated image;
processing, with each respective further relation network of the at least one further relation network, the set of images and the at least one further generated image, to determine at least one further feature vector representation of the set of images and the at least one further generated image;
processing, with another relation network, the plurality of images, to determine another feature vector representation of the plurality of images;
determining a first divergence between the feature vector representation and the another feature vector representation; and
determining at least one further divergence between each further feature vector representation of the at least one further feature vector representation and the another feature vector representation,
wherein the loss function of the adversarial network further depends on the divergence and the at least one further divergence.

15. The system of claim 10, wherein training the adversarial network includes:
processing, with an initial relation network, the set of images and the existing image, to determine the representation of (a) the set of images of the plurality of images and (b) the existing image as an initial feature vector representation of the set of images and the existing image.

16. The system of claim 10, wherein the one or more processors are further programmed and/or configured to:
provide the series of generator networks including the one or more parameters that have been modified based on the loss function of the adversarial network;
obtain input data associated with a further plurality of images and further existing image data associated with a existing image; and
process, using the series of generator networks, the input data and the further existing image data to generate output data.

17. A computing system comprising:
one or more processors programmed and/or configured to:
obtain input data associated with a plurality of images and existing image data associated with an existing image associated with an existing item, wherein each image of the plurality of images is associated with a single item of a plurality of items;
process, with an initial relation network, a set of images of the plurality of images and the existing image, to determine an initial feature vector representation of the set of images and the existing image;
process, with a first generator network of a series of generator networks including the first generator network and at least one further generator network, the initial feature vector representation, to generate image data associated with a generated image, wherein the generated image is associated with a generated item associated with the existing item;
process, with each respective relation network of a series of relation networks corresponding to the series of generator networks, the set of images of the plurality of images and the generated image data from a corresponding generator network of the series of generator networks, to determine a further feature vector representation of the set of images and the generated image; and
process, with each respective generator network of the at least one further generator network, the further feature vector representation from a preceding relation network of the series of relation networks, to generate further image data associated with at least one further generated image, wherein the at least one further generated image is associated with the generated item associated with the existing item.

18. The computing system of claim 17, wherein the one or more processors are further programmed and/or configured to:
process, with the first generator network of the series of generator networks, the initial feature vector representation and a vector representation of an item category, to generate the image data associated with the generated image; and
process, with each respective generator network of the at least one further generator network, the further feature vector representation from the preceding relation network of the series of relation networks and the representation of the item category, to generate the further image data associated with the at least one further generated image.

* * * * *